(12) United States Patent
Jensen et al.

(10) Patent No.: US 7,708,890 B2
(45) Date of Patent: *May 4, 2010

(54) METHOD OF RENDERING A RADIOACTIVE AND AQUEOUS HEAT TRANSFER LIQUID IN A NUCLEAR REACTOR TO A REDUCED RADWASTE QUANTITATIVE STATE AND RETURNING THE REMAINING WASTE WATER VOLUMES TO AN ENVIRONMENTAL RELEASE POINT FOR LIQUID EFFLUENTS

(75) Inventors: Charles E. Jensen, Knoxville, TN (US); Dennis A. Brunsell, Knoxville, TN (US); Larry E. Beets, Knoxville, TN (US)

(73) Assignee: Diversified Technologies Services, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/576,178

(22) Filed: Oct. 8, 2009

(65) Prior Publication Data

US 2010/0020915 A1     Jan. 28, 2010

Related U.S. Application Data

(63) Continuation-in-part of application No. 11/636,847, filed on Dec. 11, 2006, now Pat. No. 7,645,387.

(51) Int. Cl.
*B01D 61/00* (2006.01)
*C02F 1/44* (2006.01)
*B01D 63/00* (2006.01)

(52) U.S. Cl. ............... 210/652; 210/649; 210/650; 210/638; 210/639

(58) Field of Classification Search .......... None
See application file for complete search history.

(56) References Cited

U.S. PATENT DOCUMENTS

| 4,724,079 | A | 2/1988 | Sale et al. |
| 5,082,618 | A | 1/1992 | Dagard |
| 5,250,185 | A | 10/1993 | Tao et al. |
| 5,585,531 | A | 12/1996 | Barker et al. |
| 6,054,050 | A | 4/2000 | Dyke |

(Continued)

*Primary Examiner*—Krishnan S Menon
(74) *Attorney, Agent, or Firm*—Monroe Alex Brown, Patent Attorney

(57) ABSTRACT

Environmentally protective Method of treating an aqueous radioactive fluid (AF) in a nuclear reactor cycle or radwaste system to selectively capture or remove radioactive isotopes in a reduced quantitative package to minimize radwaste generated and revitalize neutron absorption capacity of nuclear reactor coolant by separately carrying away boron constituents, when $B_{10}$ is later added. The method includes: demineralizing the (AF) by rough ion exchange and lowering the pH of salts, boron and non-radioactive substances so that the boron can later pass through an RO; polishing by reverse osmosis; dividing the (AF) into a permeate liquid volume and a reject liquid volume, each having certain characteristics; recycling the reject liquid volume back into demineralizing step for removing generally most of the radioactive isotopes to generate a demineralizer effluent; and conveying the permeate liquid volume to the outside ambient environmental release point for liquid effluents of the (AF); dividing the demineralizer effluent into a further permeate liquid volume and a further reject liquid volume having certain characteristics; and conveying the further permeate liquid volume to the outside ambient environmental release point of the invention.

17 Claims, 12 Drawing Sheets

U.S. PATENT DOCUMENTS

| | | |
|---|---|---|
| 6,113,797 A | 9/2000 | Al-Samadi |
| 6,187,201 B1 | 2/2001 | Abe et al. |
| 6,537,456 B2 | 3/2003 | Mukhopadhyay |
| 7,067,057 B2 | 6/2006 | Rosenberger et al. |
| 2005/0211632 A1 | 9/2005 | Hung et al. |

METHOD OF RENDERING A RADIOACTIVE AND AQUEOUS HEAT TRANSFER LIQUID IN A NUCLEAR REACTOR TO A REDUCED RADWASTE QUANTITATIVE STATE AND RETURNING THE REMAINING WASTE WATER VOLUMES TO AN ENVIRONMENTAL RELEASE POINT FOR LIQUID EFFLUENTS

CROSS-REFERENCE TO RELATED APPLICATION

This application is a continuation-in-part of U.S. application Ser. No. 11/636,847, filed Dec. 11, 2006 and now U.S. Pat. No. 7,645,387 which is incorporated in its entirety, by reference as if copied verbatim herein.

BACKGROUND OF THE INVENTION

1. Field of the Invention

The present invention relates to a Method, Process or System for processing and treating an aqueous radioactive liquid in a nuclear reactor for the purpose of removing radioisotopes or radioactive metal ions and particulate so as to significantly reduce the volume of the radwaste for use, disposal or storage, and to generate only one additional stream containing the water, salts and non-radioactive components in a form that can safely be returned to the environment separate and apart from the nuclear reactor site to protect ground and ground waters.

2. Background Information

The liquid radwaste (LRW) systems in commercial nuclear power plants and utilities have used conventional demineralization to provide discharge wastewater that attempts to meet both NRC and waste quality requirements for radioactive isotopes and RCRA elements. Plants have attempted to stay below regulatory discharge requirements by using demineralizer (ion exchange) technology where the principal components have included conventionally positioned demineralizing systems consisting of tanks, essential piping, pumps and valves. Liquid wastes generated in using such past conventional setups have required further cleanup or treatment before other use in a different area of the plant and were not capable of effectively treating or processing radwaste liquids to quality grade water permitting discharge back to the outside environment.

More recently other factors have come into play. The potential contamination of rivers, lakes, bays and estuaries by plant discharges has resulted in increased nuclear insurance rates, and attention by industry peer review and audit groups, and public attention by various activist groups, has motivated utilities to continually improve environmental performance. The emphasis has therefore been on reducing releases of the main or primary gamma, beta and alpha activity contributors of cesium, cobalt iodine and others substantially below regulatory level for liquid releases to the environment.

As discharge of radioisotope emitters was reduced, secondary isotopes such as antimony and iron, previously masked or difficult to detect, became more focused. It was found that Iron isotopes 55 and 59 were not readily removed by filtration and ion exchange. Therefore, a need for a more effective removal processing before discharge became necessary.

Tritium isotopes were more readily detected but virtually impossible to separate from the process stream. Therefore, plants have been evaluating the possibility of recycle of liquid streams back to the plant for further use instead of being discharged with tritium to the environment.

Prior to the present invention, mechanical filtration and ion exchange technology were only marginally capable of meeting reduced gamma discharges, effective removal of secondary isotopes for discharge, or production of the high quality water required for recycle to allow retention of tritium.

Additionally, aspects of the past technology in dealing with RCRA wastewaters, and recycle applications containing regulated chemicals being permitted only to be discharged in limited amounts, have been sorely missing and urgently needed.

In recent decades various membrane separation processes have been developed and utilized in the field of potable water purification; and more recently in the treatment of various process and waste liquors. Some of the membrane processes are capable of removing both dissolved and particulate contaminants. The best known and most utilized membrane processes in the field of water and wastewater treatment are those utilizing pressure gradients as the process driving force. These processes include reverse osmosis, nanofiltration, ultrafiltration and microfiltration.

Conventional reverse osmosis or RO has been used in the past in certain industrial settings; having been applied to separation, concentration of product streams, and wastewater treatment. More specifically, the past conventional RO technology setups have been used for removal of radionuclides from low level liquid wastes such as waste streams at nuclear power plants. In this regard, conventionally placed RO systems have been used in the nuclear industry as a part of an overall liquid waste treatment system.

Importantly, in its conventional use and positional placement, RO was set up and placed in a position in a system or process ahead or in front of a polishing demineralization treatment, in a configuration referred to as RO-IX. In this configuration, the RO separated the raw process stream into two distinct streams: 1) the permeate (clean) and 2) the reject (dirty) stream. The clean stream, containing reduced concentrations of impurities after one or two passes, still often required polishing with downstream ion exchange media to meet quality requirements for either recycle or discharge. The reject stream, containing a high fraction of the raw stream constituents, was then conventionally subject to further processing, for example, evaporating or drying to dried solids. In this configuration, 90% to 99.9% of the waste stream contaminants were rejected by the RO and the balance removed by the downstream IX polisher.

A number of problems and deficiencies in this process setup and positional configuration have been identified. When presented with a high concentration of contaminants in the raw waste stream, a higher than desirable concentration of contaminants pass through the membrane, often requiring multiple RO passes and extensive ion exchange polishing to produce an acceptable permeate, thus resulting in increased capital equipment and operating costs and increased consumption of ion exchange resin to polish the permeate. In some instances, the RO concentrated raw stream contaminants to near their solubility limits. The volume of the reject had to be increased to preclude precipitation on the membrane and their fouling. The need for these process conditions, to effect adequate cleanup, resulted in increased equipment and operating costs, larger equipment footprint and increased resin consumption and further processing of increased reject volumes.

Additional problems in this past technology setup were found to occur with respect to utilization of the reject stream, which generally represented 2-15% of the feed stream volume. It was found that it was required to deal with such a waste stream because it contained a number of undesirable elements. In non-nuclear applications these waste streams could often be discharged to sanitary sewers or even returned to the original body of water. However, in nuclear applications, as preferred in the present invention, the reject contained radioactive isotopes that were required to be sent to special disposal facilities in a stabile or non-mobile form. Since water or substantially aqueous volumes were not regarded as an acceptable form, the water had to either be solidified or evaporated to leave dry or dirt-like solids. Since these volumes were significant the cost was found to be high, and sometimes prohibitive. As was the case before and now, often suitable locations to provide drying or solidification are not easily found in nuclear plants. In this regard, it is important to note that the present invention and method totally eliminates or substantially minimizes the need to dispose and treat the reject stream by evaporation, solidification or off-site transportation. The ion exchange media, as positioned in the invention steps removes the concentrated ions in the reject which are captured in the polishing phase or step of the invention. This prevents the osmotic pressure from increasing and the efficiency of the RO in the invention from decreasing. This means that potentially no dry solids will be generated. Therefore, this reduces the overall waste volume to be disposed in light of the fact that greater than 99% of the waste is typically boron salts when dry solids are produced. Previous systems in the past technology all generated continuous reject streams that had to be retreated. At best, these could only be recycled a short period of time prior to the results of the system deteriorating or degrading below acceptable levels. Likewise, the reject stream suffered shortcomings from this conventional processing configuration. The reject stream, generally representing 2-15% of the feed stream volume, contained 90% to 99% of the contaminants presented to the RO in the raw waste stream. Some constituents may have been near their solubility limits, and thus could not be reprocessed through the RO a second time. If the reject was returned to the plant, the high concentration of contaminants was undesirable. In the past, in the instance and application of radioactive waste, if the reject was further processed for disposal, the high concentration of contaminants might cause elevated radiation doses to personnel. In other instances, the high concentration of specific isotopes might cause an increase in waste classification from the desirable low Class A classification to Class B and C, resulting in more onerous packaging, shipping and disposal requirements. In past occurrences, the concentration of certain radioactive constituents caused the classification to be greater than Class C (GTCC), which precluded or denied disposal by any means.

Additionally, in instances where the reject volume was increased to preclude exceeding the solubility of raw waste stream constituents to prevent membrane fouling, the greater volume of reject resulted in increased secondary processing costs for such treatment processes as evaporation, drying or solidification. The increased reject volumes and secondary processing costs reduced the economic viability of the conventional RO-IX positional setup and process configuration.

Also, in non-nuclear applications these concentrated reject constituents precluded normal discharge to sanitary sewers, or return to the original body of water. If these existing permeate and reject stream problems could be solved, substantial operational and economical benefits would be realized, thus enhancing the value and utility of RO as a purifying method, including RO treatment of nuclear waste or process streams. Therefore, the teachings of the present invention were developed to overcome the problematic issues in the past technology regarding these matters, particularly with regard to processing and treatment of heat transfer and other radioactive liquids the subject of chemical change and reaction in a nuclear reactor.

Further, in this regard, in distinguishing over the past technology in this area, the present invention treats nuclear reactor cooling water or a heat transfer water from nuclear reactor cycles to remove radioactive metal ions. The present invention is designed to pass through as many of the nonradioactive components in the water as possible for the purpose of minimizing the quantity of radwaste generated for evaluation and other uses. By utilizing the gross demineralizer means of the present invention for active processing by ion exchange of the (AF) in front of the invention's polishing reverse osmosis (RO) step, the ionic exchange media of the gross demineralizing step of the invention accumulates more radioactive metals and the following (RO)-polishing step and means is protected from accumulating greater amounts of radioactive dose and emitting greater amounts of gamma emissions from such radiation to personnel working in the area.

Utilizing the ion exchange or ion capture of demineralization of the present invention in front of the RO also maximizes the utilization of the ion exchange media as the loading of as much radioactive metal ion as possible occurs. Using the ion exchange media after the RO, as done in prior art technology, often meant less than 60-70% utilization of the media and much lower loading of radioisotopes.

Additionally, Boron passage is maximized utilizing the present invention while past technology, such as Dagard (U.S. Pat. No. 5,082,618) entitled "Method and Device For Modifying the Concentration of the Soluble Poison Contained in the Cooling Fluid of the Primary Circuit of a Nuclear Reactor", decreased the passage of Boron. Importantly, Salts and nonradioactive metals are passed on through the present invention as much as possible to reduce the volume of radwaste generated. In this regard the present invention is utilized as the sole release point for liquid effluents from a nuclear power plant. Liquids must be released as a license condition for the operation of the plant. B10 (also referenced herein as $B_{10}$ and boron-B10) is consumed as a neutron absorption agent to control the nuclear reaction and is converted to B11 ($B_{11}$). While references such as the Dagard patent teach retaining B11 the present invention's method functions to remove the B11 and assist revitalization of the neutron absorption capacity (poison) of the reactor coolant with the addition of fresh B10.

To restate, though Dagard relates to PWR nuclear plants, its teachings clearly address the removal of boric acid (which it places within part of its definition or terminology as "poison") from the primary water of the plant. Distinguishably, the present invention addresses the passage of boric acid (the Dagard 'poison') through the membranes so as little as possible of the boric acid is removed. The clear intention of the present invention is not to modify the concentration of the boric acid, but to assure its element form as Boric Acid and pass it through along with salts and other non-radioactive components through the method's system as part of the environmentally protective quality water to be released to the environment as the sole aqueous waste stream; and, in so doing, to reduce the radwaste volume for use, storage or disposal without the need of past practices of drying and/or solidification to do so. Dagard addresses ion exchange, but only for the removal of boric acid regarding which the present method emphasizes minimization and elimination for so doing. Dagard also teaches the use of ammonia which would be detrimental to the present method because it causes decreased efficiency of the RO and demineralizers. Also, one of the express primary purposes of the present method and invention in removing radioisotopes or radioactive metal ions is not addressed in Dagard in any manner; nor would it be correct to assume in their disclosure that it would be obvious to address such a purpose.

Further, in non-analogous technology in relation to that of nuclear reactor liquid treatment, the Al-Samadi patent (U.S. Pat. No. 6,113,797), entitled "High Water Recovery Membrane Purification Process" utilizes a two stage RO process with pretreatment limited to filtration to deal with scaling elements such as calcium and magnesium. Distinguishably, the present invention does not have to deal with scaling issues since it utilizes, as a part of it's demineralization step, ion exchange to remove scaling metals and filtration to remove solids prior to the polishing RO step of the invention, along with serving the other purposes in the invention of aiding reduction of the amount of radioactive isotopes passing therethrough. The present invention further distinguishes over Al-Samadi in discharging 100% of the influent water entering the present method in the aqueous radioactive liquid as purified water, without the need for a separate waste liquid stream which could not be released to the environment.

Also, the Rosenberger invention (U.S. Pat. No. 7,067,057), entitled "Fluid Conveyed Material Collection System", discloses a device which does not teach the use of ion exchange in advance of RO, as the present invention does. It also teaches the use of further processing of RO concentrate to either dry solids or other solidification methods in great distinction to the present invention. Rosenberger also appears to require the use of precipitants. Rosenberger also teaches 'backflushing" which is not present and would achieve no purpose in the present invention in that it causes much additional 'tankage' and process interruptions that is unneeded and would be a great disadvantage if used in the present invention. Rosenberger also teaches that one or more streams from membrane processes require additional outside processing to bring the final materials to a disposable and dischargeable state. Also, in relation to the teachings of the present invention, the Rosenberger device's use of evaporation, electrode coagulation, centrifugation and precipitating agents makes the use of this device a more complex and capital intensive process. In this regard, at least two membrane systems are required for most applications set forth for the Rosenberger device.

Further in divergent and non-analogous technology in relation to treatment of a nuclear reactor liquid, the Mukhopadhyay patent (U.S. Pat. No. 6,537,456) entitled "Method and Apparatus For High Efficiency Reverse Osmosis Operation", does not disclose use of any recycle of its subject reject stream. Mukhopadhyay simply sets forth a process employing a very standard approach to RO which would not address the problems of seeking to emit a single waste stream of quality water to the environment as does the present invention and method. Though it appears that the Mukhopadhyay process employs the use of ion exchange media both in front and after the RO disclosed the reference does not in any way provide for recycle of any reject stream to the front of the system, as the present invention does to achieve the important purpose of improving the filtration of radioactive contaminants and allowing the salts and non-radioactive components to move through to ultimate clean water environmental disposal while allowing the volume of the radwaste to be significantly less for storage, use or disposal. In a similar regard, this patent reference teaches use of the RO as a gross separator rather than the specific relegation and limitation as in the present invention method to a "polisher" and sole use in a "polishing" capacity. Also, very importantly, Mukhopadhyay teaches the 'minimization' and strict limitation of boron and silica passage through its process, where the method of the present invention seeks to 'maximize' the passage of these substances for important object and purpose of the present invention as indicated to uniquely and significantly minimize the radioactive waste volume for later use, storage or disposal. Mukhopadhyay makes no attempt to address this problem and must be considered significantly non-analogous to the operation and chemical processes of a nuclear reactor for this reason among others. In dealing with chemical nuclear reactor processes in the past technology the reject volume issuing from a nuclear reactor posed a significant waste volume problem that had to normally be disposed in a nuclear application setting through either drying or solidification. The present invention uniquely and importantly provides a novel method, which might normally be unexpected by simply looking at the alignment of elements utilized in the present method and invention, to significantly solve the radioactive waste volume problem while still providing only one aqueous stream to be returned to the environment rather than to another location at the nuclear reactor site or for logistical placement, storage or disposal at a non-environmental location.

Each of the references above; or those like them, but also distinguishable; fail to teach important aspects of the method of the present invention. For example, each of the analogous or non-analogous references in the past technology failed to recognize the usefulness of using a more broad spectrum ion exchange media in front of the RO to capture all of the ions in a concentrated form such that the RO could be subsequently used as a polishing method step rather than as a primary separator. All of the references in the past technology in this or any remotely related area used the RO as a primary separator rather than as a polisher where the RO reject was then at a concentration that the primary ion exchange beds could remove it to reasonable levels. All of the other references also required significantly more equipment to provide the same permeate results, and all had a secondary waste other than membranes or media regarding which they had to account for and dispose.

Accordingly, it is an object of the present invention to provide a permeate stream or first liquid volume and a reject stream or second liquid volume, so that the reject stream is recycled back to the front of it's own system process of which it is a part of, or back to the nuclear reactor plant source, so that the repetitive effect of the invention's non-conventional gross demineralizer step in the present invention can be achieved; i.e., the removal percentage of demineralizers employed in such a system is great enough; to prevent excess buildup of most all isotopes and other fouling chemicals.

It is also an object of the invention, in preferred embodiments, to utilize a method and system in proximate location to the end of its novel gross demineralizer of (AF) processing step to specifically polish radwaste or radioactive wastewater from a radwaste system of a nuclear reactor of the remaining isotopes and other dissolved and colloidal materials, when present.

It is a further object of the invention to maximize boron control. In the present invention this is accomplished by passage or recycle through the invention's non-conventional polishing RO process step. This is done to meet the requirements necessary for discharge of an aqueous wastestream directly to the environment apart from the nuclear reactor site or recycle within the steps of the present method. This is accomplished, in part within the present method, by raising or lowering the pH for the purpose of altering the characteristics of the aqueous wastestream to assure formation and passage of boric acid with the waste stream of the invention released to the ambient environment outside a nuclear reactor site.

A further object exists in facilitating the periodic use of a chemical treatment system to precipitate the silica in the system, or capture the silica by selective ion exchange when required.

Further objects and advantages of the present invention include utilizing the RWRO post IX polisher therein of the invention; the advantageous use of carbon filters and ion exchange resins as good removal media for TOC found in the feed water; the reduction of TOC fouling of RO membranes; the use of deep bed carbon filtration ahead of demineralizers to reduce fouling as compared to mechanical filters conventionally used ahead of RO systems; the reduction of TSS fouling of RO membranes; the reduction of dose rate on RO system and membranes; the quality of the water discharged to the environment; and the maximization of resin utilization by exposing the resin to higher influent activity concentration and retaining resin until completely depleted; and the utilization of acid conditions by cation resin (i.e., hydrogen form cation resin before the RWRO) to reduce pH adjustment and improve BA passage.

Additional objects and benefits include: the reduction of volume rejected and returned to the nuclear reactor plant; the reduction in the waste classification of concentrates and/or resulting dried solids; the maximization of resin utilization by exposing resin to a higher influent activity concentration; the prevention of the return to the nuclear reactor plant, or environmental discharge, of difficult to remove isotopes; the facilitation of scavenging for and selective capturing or removal of targeted isotopes, such as antimony, Cobalt, Cesium, Iodine, Tellurium, Manganese, Iron, Silver, Chromium, and Niobium, and those related thereto in the nuclear cooling fluid and radwaste processes.

In a smaller waste stream, then provided as a result of the present process; and the decrease on osmotic load through the use of increased reject flow rate.

It is a further object of the invention to more effectively and efficiently provide for reduced radioisotope discharges, removal of secondary isotopes for discharge, and production of high quality water for recycle within the invention's process and release to the environment to allow retention of tritium.

It is a further object to provide effective boron recycle or for recycle of other non-radioactive elements for further processing within the invention's system.

A further object exists in providing a system which has application in dealing with RCRA wastewaters and recycle of regulated chemicals that can be discharged only in limited quantities.

It is the object of the present invention to provide a methodology of applying RO and ion exchange (IX) in such a functional and positional manner as to create more favorable operating conditions and performance of the RO and demineralizer (IX) by situating the demineralizer system ahead of the RO in a configuration referred to as IX-RO. In so doing, the RO acts as a polisher in follow-up to the gross demineralization step in the system. In the IX-RO configuration, often 90% to 99% of the contaminants will be removed by the IX system in advance of the RO polisher. A secondary configuration provides demineralization of the reject stream to further strip undesirable species from the reject before recycling or processing of the reject stream. These configurations result in improved RO performance and improved permeate and reject stream quality and conditions.

Another object and advantage of the invention includes IX scavenging of raw waste stream constituents that, when concentrated in the RO, could precipitate and foul the RO membranes. Reduction of such agents permits controlling the reject flow rates to meet the hydraulic needs of the membranes instead of adjustment to control internal RO precipitation, where such adjustments would result in reduced reject flow rates and volumes that must be recycled or treated.

A further object and advantage is served by IX scavenging of raw waste stream constituents, resulting in reduced concentration of contaminants in the reject stream. This favorable condition reduces the inventory of contaminants recycled within the process system itself. The lower concentration of reject contaminants permits reprocessing through the IX-RO system with reduced concern of precipitation.

Another object and advantage of the invention is set forth by IX scavenging of raw waste stream constituents, including reduction in the concentration of key isotopes that affect waste classification for waste packaging, shipping and burial. Reduction of these isotopes in the raw waste stream, results in advantageous and supportive reduction in the reject stream subject to secondary processing for disposal.

A further object and advantage of the invention is served by IX scavenging of raw waste stream constituents, including radioactive isotopes, to reduce mechanical entrapment of isotopes in the RO membranes and process equipment system.

Accordingly, the lower radioactive dose rates achieved through using the present method in nuclear reactor liquids to change their chemical makeup, volume and packaging reduce exposure to operating personnel. This also reduces the frequency of, or need for, cleaning RO membranes, which would normally be needed to address and lower accumulated substances causing radioactivity. This facilitates avoidance of exposure to personnel, which would otherwise be necessary for handling and packaging of expended membranes. Further objects and advantages of the invention are served by IX scavenging, i.e., gross demineralizing of contaminants from the reject stream to reduced isotopic content, resulting in reduced dose buildup during secondary processing within the present invention of the reject stream or volume. Particular isotopes; for example, cesium 137, cobalt 60, carbon 14, iron 55, nickel 63 and antimony 125, when present in elevated concentrations, may result in elevated waste classification imposed by the Nuclear Regulatory Commission and other governmental and regulatory bodies. This results in more onerous packaging, shipping and burial requirements. Scavenging, by IX-gross demineralizing, for these and other select isotopes from the reject stream enables maintenance of Class A classification, resulting in reduced handling and disposal costs.

Additional objects and advantages of the invention include IX scavenging of raw waste stream constituents, to reduce the concentration of contaminants presented to the RO. Lower RO influent contaminates results in reduced contaminant concentrations in the RO permeate. This reduces or eliminates the need for additional RO passes to effect cleanup of the process stream; or, in turn, reduces or eliminates the need for post-RO IX polishing of the permeate for discharge or recycle.

Other objects and advantages of the invention are served by IX scavenging of raw waste stream constituents to reduce the concentration of contaminants presented to the RO. This results in contaminants being affixed or captured by the IX-gross demineralizing step or being affixed or captured by the IX system of the invention. This is a more favorable and efficient waste form for handling, packaging and disposal.

An additional object of the invention, and advantage served, includes IX scavenging of raw waste stream constituents, where the RO acts as a polisher. This maximizes IX resin utilization by permitting IX beds to remain in service well beyond normal chemical depletion. Ionic leakage from partially or fully chemically depleted IX bed is either captured by downstream IX bed; or when passed to the RO, is rejected to the reject stream. This contribution to the reject stream, in this case, is sufficiently small, often 1%-2% of the influent stream contaminate total. This does not materially or adversely affect the quality and secondary processing of the reject stream.

A further object, and advantage, of the invention lies in maximizing resin utilization and consumption reduction wherein the IX beds are exposed to the maximum concentration of contaminants of the raw process stream. This results in a more complete utilization of the exchange capacity of the resin and higher exchange equilibrium. All of these things result in higher waste loading and reduced resin consumption, compared to IX performance when positioned in the dilute contaminant stream of the RO permeate as was the case in the past conventional technology.

Another object of the invention is to set forth IX positioning in advance of the RO to enhance boron passage through the RO membranes. This enhanced passage is affected by pH reduction as the process stream passes through hydrogen form cation resin or by addition of acids, such as sulfuric or hydrochloric, to the process stream. Passage of a greater fraction of the boron to the permeate permits recovery of boron in the permeate and reduces the concentration in the reject stream. This avoids RO operating limitations imposed by the potential for precipitation of boron; and also reduces the resulting dried waste volumes due to reduced boron content. In the alternative, when minimizing boric acid in the permeate; the pH can be increased by passing the process stream through a hydroxide form anion resin or by addition of a basic solution such as sodium hydroxide.

A further object includes setting forth a system where the IX position is placed in advance of the RO, in facilitating the periodic use of a chemical treatment system to precipitate silica in the IX system, or for capturing the silica by selective ion exchange when required or appropriate. An additional object is to set forth in the present method and system where the IX position is placed in advance of the RO in facilitating improved TOC removal from carbon filters downstream. When employed such carbon filters have the primary purpose in filtration and TOC removal. The use of IX aids in removal of that fraction of TOC that successfully transits the carbon filter. This protects the downstream RO from TOC contamination (a primary membrane fouling mechanism).

Yet a further object of the invention includes presenting a system and process that provides the further advantage of utilizing the RWRO as a post IX polisher in the invention. Other related advantages, in this regard, include the advantageous use of carbon filters and ion exchange resins as removal media for TOC found in the feed water; the reduction of TOC fouling of RO membranes; the use of deep bed carbon filtration ahead of demineralizers to reduce fouling as compared to mechanical filters conventionally used ahead of RO systems; the reduction of TSS fouling of RO membranes; the reduction of dose rate on RO system and membranes; the reduction of activity returned to the plant or discharged to the environment; the maximization of resin utilization by exposing the resin to higher influent activity concentration and retaining resin until completely depleted; and the utilization of acid conditions when needed.

It will, therefore, be understood by those skilled in these technologies that substantial and distinguishable device, process and functional advantages are realized in the present invention over the past conventional technology with regard to processing, treating, packaging and chemically affecting a radwaste liquid in a nuclear reactor. It will also be appreciated that the efficiency, flexibility, adaptability of operation, diverse utility, and distinguishable functional applications of the present invention all serve as important bases for novelty of the invention, in this field of technology.

SUMMARY OF THE INVENTION

The foregoing and other objects of the invention can be achieved with the present invention's method and system. In one aspect, the invention includes a method and associated system for more particularly polishing a radioactive and aqueous liquid or aqueous radioactive fluid or (AF), or radioactive liquid volume or (AL) of a nuclear reactor, supplied from a nuclear reactor or radwaste system of a nuclear reactor to a supply area location preferably at the nuclear plant site location. In its principal aspect the invention includes a method of processing or treating an aqueous radioactive fluid or (AF) in or from a nuclear reactor to selectively capture or remove radioactive isotopes in a reduced quantitative package in a form which is substantially devoid or lacking solid salt constituents. This acts to greatly minimize the amount of radwaste generated for evaluation, evaporation, solidification, off-site transportation or later activity, and to revitalize the neutron absorption capacity of the nuclear reactor coolant by separately carrying away boron constituents in the (AF) as part of the release point in the method for liquid effluents of the (AF) from the nuclear reactor radwaste system or nuclear reactor wastewater plant to the ambient environment outside such a site. The method of the present invention includes the steps, after directing the (AF) to a supply area at a nuclear reactor site or nuclear reactor radwaste system, of: (a) demineralizing the (AF) by gross or rough ion exchange or as a function of roughing through ion exchange, and lowering the pH of salts, boron and nonradioactive substances passing through so that the boron can later pass through an RO; (b) polishing by reverse osmosis (RO), and (c) dividing the (AF) into a permeate liquid volume and a reject liquid volume, where the permeate liquid volume has from about half to substantially none of the radioactive isotopes present in the (AF) and a substantial amount of any monovalent salts, boric acid and water present in the (AF) and generally a lower isotopic, organic and mineral content, and the reject volume has at least an increased fraction of the boron, salts and radioactive isotopes present in the (AF) and generally an increased isotopic, organic and mineral content; (d) recycling the reject liquid volume back into step (a) for removing generally most of the radioactive isotopes to generate a demineralizer effluent and conveying the permeate liquid volume to the release point for liquid effluents of the (AF) from the nuclear reactor to the outside ambient environment, and dividing the demineralizer effluent into a further permeate liquid volume having substantially none of the radioactive isotopes present in the demineralizer effluent and having a reduced volume relative to the recycling and feeding the reject liquid volume and a further reject liquid volume having any of the radioactive isotopes remaining in the demineralizer effluent; and (e) conveying the further permeate liquid volume to the release point for liquid effluents of the (AF) from the nuclear reactor radwaste system to the outside ambient environment. In this regard, the invention also includes the option in addition to step (e), just above, of conveying the further reject liquid volume to a selected area for analysis and evaluation of a group of further actions to be taken; including, but not limited to: reuse, disposal, recycle, discharge to the release point for liquid effluents of the (AF) and holdover.

In another aspect, the invention includes a method of maximizing resin utilization, more particularly polishing an aqueous radioactive liquid or (AF) supplied to a system at a supply area from a nuclear reactor radwaste system or nuclear reactor wastewater plant at a nuclear reactor site, and selectively scavenging for targeted radioactive isotopes; by permitting greater concentrations thereof and exposing filter media and resin to a higher influent activity concentration. This method includes or encompasses the steps of: filtering the (AF); demineralizing the (AF) by gross ion exchange or filtering, or as a function of roughing through ion exchange; passing the (AF) through a polishing reverse osmosis step; dividing the (AF) into a permeate liquid volume and a reject liquid volume, where the permeate liquid volume has a lower isotopic, organic and mineral content and the reject volume has an increased isotopic, organic and mineral content and a substantially greater concentration of reject ions and contaminants in relation to the (AF) prior to the dividing step; recycling the reject liquid volume to the supply area and filtering step; and conveying the permeate liquid volume to an outside environmental release point for liquid effluents of the (AF).

In related aspects, the invention includes a method of maximizing resin utilization, more particularly polishing an aqueous radioactive liquid volume or (AF) supplied to a system at a supply area from a nuclear reactor system and selectively scavenging for targeted radioactive isotopes (radioactive metal ions or radioisotopes) by permitting greater concentrations thereof and exposing filter media and resin to a higher influent activity concentration. This method includes or encompasses the steps of: filtering the (AF); demineralizing by or as a function of gross ion exchange or roughing through ion exchange the (AF); passing the (AF) through a polishing reverse osmosis step; dividing the (AF) into a permeate liquid volume and a reject liquid volume where the permeate liquid volume has a lower isotopic, organic and mineral content and the reject volume has an increased isotopic, organic and mineral content compared to the permeate (and often a lower rejected ion concentration than in the raw feed stream prior to filtering (AF)); recycling the reject liquid volume to the supply area and filtering step, thus eliminating the requirement to process the reject stream to dry solids or solidification; and conveying the permeate liquid volume to an outside environmental release point for liquid effluents of the (AF).

In another related aspect, the invention includes a method of treating a primary aqueous radioactive heat transfer liquid or (AF) in a nuclear reactor area to generate an aqueous liquid waste having boron and non-radioactive components for conveying from the nuclear reactor area for release at an ambient environmental release point for liquid effluents of the (AF) apart and outside of the nuclear reactor area, as discussed below, without generating a liquid waste stream for separate non-environmental disposal, and for maximizing resin usage within an ion exchange resin utilized to more particularly polish the (AF). In this related aspect of the invention, the method includes the steps of: (a) prefiltering the (AF) to reduce fouling constituents therein by a step comprising at least one step selected from a group consisting of: the step of filtering the (AF), the step of filtering a liquid volume on recycle, the step of carbon filtering the (AF) and the step of carbon filtering a liquid volume on recycle; (b) demineralizing the (AF) by gross ion exchange such that between about 70% and about 99% of contaminants, fouling chemicals and colloidal materials in the (AF) are removed with the exception of boron and silica present in the (AF), thereby concentrating those contaminants and isotopes that still remain into demineralization media and lowering the pH of substances that pass through such that substantially most of the boron can later pass through an RO membrane as boric acid moieties; (c) particularly polishing the (AF) by reverse osmosis or (RO) for selectively scavenging for targeted isotopes and other dissolved and colloidal materials when present and remaining;

(d) dividing the (AF) into a first liquid volume or permeate liquid volume and a second liquid volume or reject liquid volume where the permeate liquid volume has from about half to substantially none of the radioactive isotopes present in the (AF) and a substantial amount of any monovalent salts, boric acid and water present in the (AF), and the reject liquid volume has at least an increased fraction of the boron, salts and radioactive isotopes present in the (AF); (e) recycling and feeding the reject liquid volume back into step (a) for removing generally most of the radioactive isotopes to generate a demineralizer effluent, and conveying the permeate liquid volume to the ambient environmental release point for liquid effluents of the (AF), from the nuclear reactor to the outside ambient environment, and dividing the demineralizer effluent into a further permeate liquid volume having substantially none of the radioactive isotopes present in the demineralizer effluent and having a reduced volume relative to said recycling and feeding the reject liquid volume, and a further reject liquid volume having any of the radioactive isotopes remaining in the demineralizer effluent; and (f) conveying the further permeate liquid volume from the nuclear reactor to the ambient environmental release point for liquid effluents of the (AF), and conveying the further reject liquid volume to a selected respective area in a group of respective areas consisting of those for evaluation, reuse, disposal, recycle again and holdover. Related to this aspect the selective scavenging for targeted isotopes in step (c) includes the step of adjusting the reverse osmosis through selecting and using ion exchange media for selective sensitivity for respective isotopes from a group consisting of Antimony, Cobalt, Cesium, Iodine, Tellurium, Manganese, Iron, Silver, Chromium, and Niobium.

In yet a further related aspect the invention includes a method or system for processing a primary aqueous radioactive liquid volume or (AL) of a nuclear reactor for maximizing boron-B11 passage out of the system, generating at least one aqueous liquid waste volume having environmentally acceptable salts, boron and non-radioactive constituents for release to the outside ambient environment or environmental area outside and apart from said nuclear reactor without generating an aqueous waste stream for separate non-environmental disposal, for maximizing resin utilization within an ion exchange resin and more particularly polishing the (AL) as a benefit within said system of the alignment of placing gross ion exchange means or (IX) directly adjacent and prior in position to an RO means and a function so as to permit greater concentrations thereof and exposing filter media and resin to a higher influent activity concentration as discussed below, and for revitalizing the nuclear efficiency of the primary (AL) of the nuclear reactor through the maximizing boron-B11 passage out of the system and later adding a new volume of boron-B10 to the (AL) in the nuclear reactor. This B10 and B11 relationship is discussed in more detail below. In this aspect of the invention the (AL) is provided to the supply area at the site of the nuclear reactor as described elsewhere herein. In this aspect the method includes the steps of: (a) lowering the pH of the (AL) in the supply area to improve boric acid presence and retained passage by the (AL) by selecting a step from a group of steps consisting of passing the (AL) through a hydrogen form cation resin area, and adding an acid constituent to the (AL); (b) demineralizing the (AL) by gross ion exchange; (c) polishing the (AL) by reverse osmosis; (d) dividing the (AL) into a permeate liquid volume and a reject liquid volume, where the permeate liquid volume has a lower radioactive contaminant content and a lower isotopic, organic and mineral content, and the reject liquid volume has an increased non-radioactive content and an increased isotopic, organic and mineral content; (e) conveying the permeate liquid volume for release to the outside ambient environment; (f) directing the reject liquid volume to at least one successive recycling, where each of the successive recycling comprises recycling the reject liquid volume to the supply area and contemporaneously adding and combining with the reject liquid volume in the supply area further amounts of new (AL) from the nuclear reactor to bring the combination to equilibrium or a steady state condition, discussed below, to form a recycled feedstream, and passing the recycled feedstream through, and repeating, the steps (a), (b), (c), (d) and (e) of the method; and (g) adding a new volume of boron-B10 to the (AL) in the nuclear reactor within an appropriate time factor in accordance with use of the (AL) in the nuclear reactor and as a part of revitalizing the nuclear efficiency of the primary (AL) of said nuclear reactor.

BRIEF DESCRIPTION OF THE DRAWINGS

The following drawings illustrate exemplary embodiments for carrying out the invention. Like reference numerals refer to like parts in different views or embodiments of the present invention in the drawings.

REFERENCE NUMERALS

Figure 1:
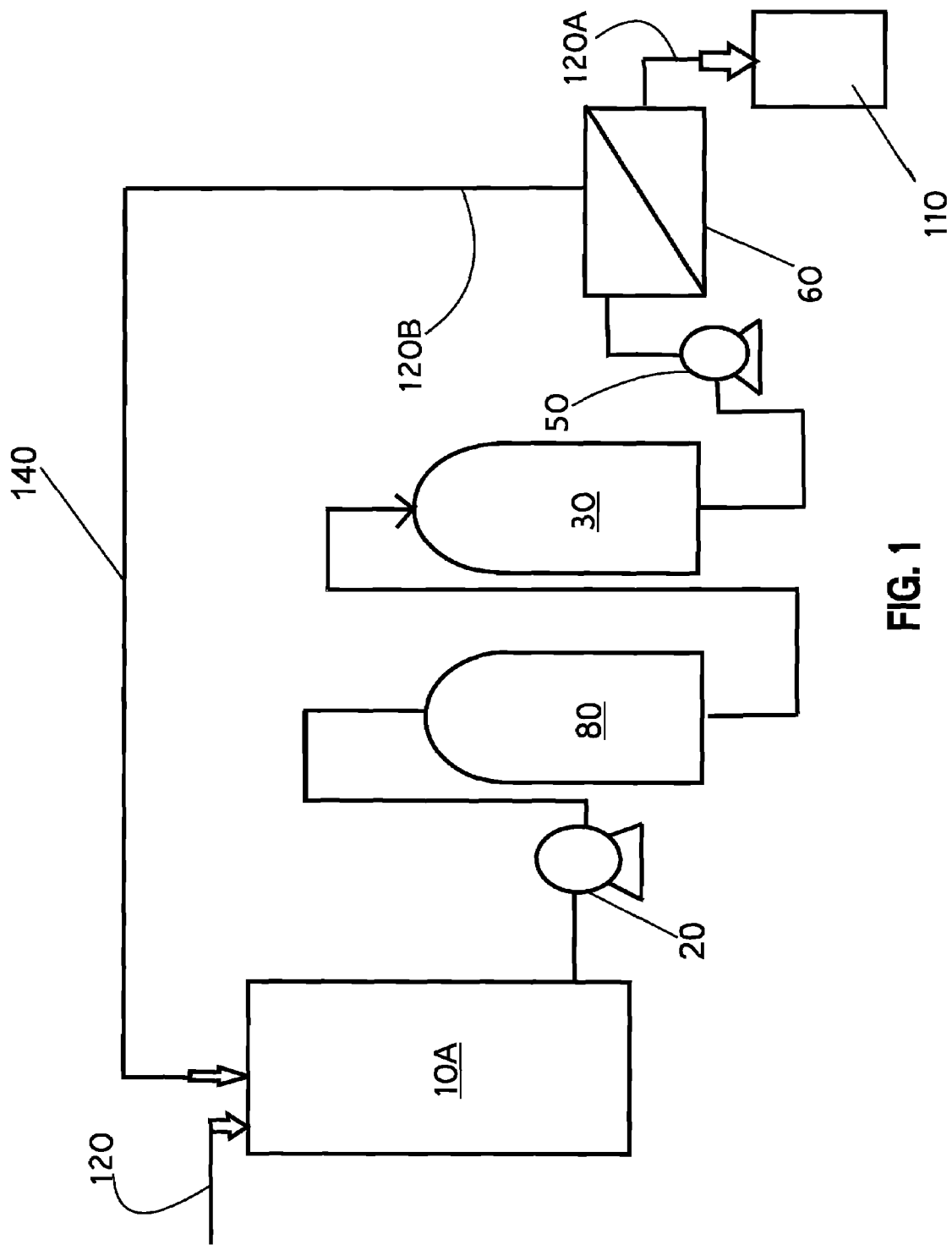
FIG. 1 is a flow chart of a method of treating an aqueous radioactive fluid in a nuclear reactor cycle or radwaste system according to an exemplary embodiment of the invention.
Figure 1A:
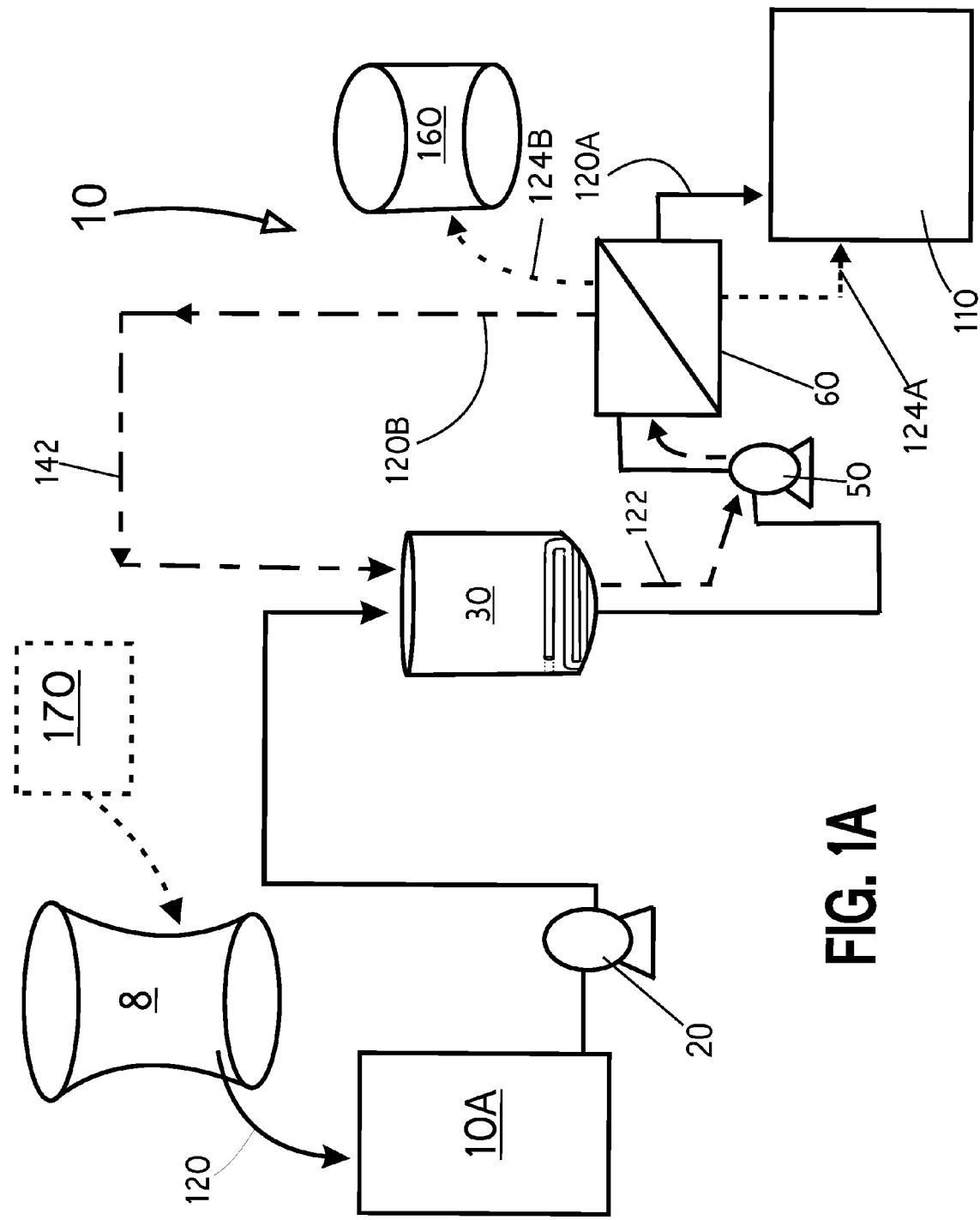
FIG. 1A is a flow chart of a preferred embodiment of the method of the present invention of processing a volume of an aqueous radioactive fluid or (AF) removed from a nuclear reactor to selectively capture radioactive isotopes in a reduced quantitative package devoid of solid salt constituents, minimize the amount of radwaste for evaluation, evaporation, solidification, off-site transportation or later activity, and assist in revitalizing neutron absorption capacity of fluid in the nuclear reactor by removing boron in the form of $B_{11}$ from the fluid as a part of the present method, when $B_{10}$ is later added to such fluid.

8 Nuclear Reactor or Nuclear Reactor Plant or Facility, or nuclear reactor radwaste system or nuclear reactor wastewater plant, at a nuclear reactor site, from which at least a part, portion or volume of an aqueous radioactive fluid or (AF) (120), or such fluid containing $B_{11}$, is removed for purposes of processing this (AF) through the method steps of the present RWRO invention (10)

10 RWRO System, the Method steps of the present invention

10A Supply area receiving the (AF) 120, or the step of supplying an AF (120) to a supply area

20 Conveyance subassembly or means or step

30 Gross or Roughing Demineralizer assembly or gross demineralizing step or step of demineralizing by, or as a function of, gross ion exchange or roughing through ion exchange

30A Gross Demineralizing step (as described in 30) in a first area or location

30B Gross Demineralizing step (as described in 30) in a second or further area or location

40 Mechanical filtration or filter, or filtering step

50 Reverse osmosis conveyance unit or pump, or step

60 Polishing Reverse osmosis unit/subassembly or RO, or polishing RO step or step of conveying AF to the polishing RO

60A Dividing the AF (60) into a permeate liquid volume 120A and a reject liquid volume 120B (60A)

70 Reject demineralizer assembly or reject demineralizer step (based on 30, as described above)

80 Carbon filter, or carbon filter or filtering step

90 Chemical supply tank, or step of adding a chemical substance to the reject volume (120B) or adjusting the pH of the reject volume

100 Chemical supply conveyance or pump facilitating (90), or such means 110 Release point for liquid effluents of the (AF) from the nuclear reactor to the outside ambient environment, area or step and for Evaluation, Appraisement or Monitoring as a part of this area or step

110 Release Point for Liquid Effluents of the (AF), area or step, or at least one step of conveying a liquid volume of the (AF) to a sole or substantially unitary release point for liquid effluents of the (AF), in the method's treatment in the invention, to or in an ambient environmental area or environment apart and outside of a nuclear reactor site or plant for environmental release of environmentally acceptable liquid effluents produced as a result of the method of the invention.

120 Aqueous Radioactive Liquid or aqueous radioactive fluid or AF or wastewater (Influent), from a nuclear reactor, a nuclear reactor radwaste system or nuclear reactor wastewater plant, at a nuclear reactor site

120A Permeate Liquid volume or stream

120B Reject Liquid stream or volume

122 Dimineralizer effluent generated after recycling the reject liquid volume (120B) back through demineralizing by gross ion exchange (30)

124A Further permeate liquid volume of (122)

124B Further reject volume of (122), selectively subject to, or directed for, recycle, reuse, holdup or evaluation, or other use

130 Further conveyance means or booster unit or pump, or step

140 The Step where a reject liquid volume 120B is sent back as a recycle stream directly to the supply area 10A, carbon filtering step 80, filtering step 40, or demineralizing step 30, without having a chemical adjustment

140A Recycling the reject Liquid volume 120B to the supply area 10A or the carbon filtering step 80, after pH adjustment or chemical treatment, and/or demineralization

142 Recycling the reject liquid volume (120B) to demineralizing by gross ion exchange (30)

150 Holdup area, and the step of conveying and enclosing the reject liquid volume 120B therein

160 Area for storage, redirection or reconveyance as to recycle, evaluation, evaporation, solidification, off-site transportation or later activity

170 Area where Boron in a form of $B_{10}$ can be supplied to the nuclear reactor (8) later or during periodic or sustained time periods after at least a part of portion of the (AF) (120) has been removed from the nuclear reactor facility (8) for processing through the method steps of the present RWRO invention (10)

DETAILED DESCRIPTION OF THE PREFERRED EMBODIMENTS OF THE INVENTION

The following description of the preferred embodiments of the concepts and teachings of the present invention is made in reference to the accompanying drawing figures which constitute illustrated examples of the teachings, and structural and functional elements, of the present invention; among many other examples existing within the scope and spirit of the present invention.

Referring now to the drawings, FIGS. 1 through 11, thereof, there are illustrated, by schematic means, exemplary embodiments of the present invention addressing the method and system of maximizing resin utilization within an ion exchange resin, more particularly polishing an aqueous liquid (AF, 120) containing radwaste or plant wastewater and selectively scavenging targeted isotopes and some other dissolved species; shown at 10, and referred to hereafter as the RWRO system, the Method or the invention. The present invention sets forth a unique method or process of utilizing ion exchange resin and reverse osmosis to reduce environmental discharges; i.e., environmentally harmful discharges, and improve effluent quality so as to permit recycle of aqueous or radwaste liquid from a nuclear reactor, nuclear reactor radwaste system' or nuclear reactor wastewater plant within the method's system.

The preferred exemplary embodiments of the invention include related variations of the following components or steps bringing such functions about: supply area 10A, conveyance subassembly or means 20, mechanical filtration or filter 40, demineralizer assembly 30, carbon filter 80, further conveyance means or booster unit or pump 130, reverse osmosis conveyance unit or pump 50, reverse osmosis unit/subassembly or RO 60, evaluation, Release Point for Liquid Effluents of the (AF) area or step 110 or appraisement or monitoring area of 110, reject demineralizer assembly 70, chemical supply tank 90, and chemical supply conveyance or pump 100.

Each of the exemplary and preferred embodiments characterized and illustrated herein, respectively in FIGS. 1 through 11, indicate an initial starting step of supplying an (AF) 120 to a supply area 10A; and exemplary preferred embodiments of this step have been set forth herein. However, it is within the scope and spirit of the present invention that aqueous liquid 120 can be supplied for processing to the RWRO system 10 through other conveyance, storage and/or supply means or directly from a nuclear reactor on site, or nuclear reactor radwaste system or nuclear reactor wastewater plant system.

In preferred embodiments, the (AF) 120 is an aqueous radioactive liquid from a nuclear reactor containing radioactive isotopes (or radioactive metal ions). In this regard the (AF) 120 is a liquid from respective nuclear reactor cycles or nuclear reactor radwaste system or nuclear reactor wastewater plant, including a heat transfer liquid from a nuclear reactor, liquid products from spent fuel storage from a nuclear reactor, radioactive liquid residues and leached liquid substances from decontamination of materials at a nuclear reactor, or liquid residues separable from clothing and equipment used in spatial relation to nuclear reaction chemical cycles at a nuclear reactor.

Importantly, as indicated in part above, with regard to distinguishing over the prior technology in this area, the present RWRO system 10 treats nuclear reactor cooling water or a heat transfer liquid from respective nuclear reactor cycles referenced above, to remove radioactive metal ions. The RWRO 10 is designed to pass through as many of the nonradioactive components in the aqueous liquid as possible for the purpose of minimizing the quantity of radwaste generated for evaluation including use, storage, disposal, recycle and/or later further use in relation to the nuclear reactor and the chemical process reactions in the nuclear reactor providing liquids to be treated and processed in the RWRO 10. By utilizing a gross or roughing demineralizer means 30 in the RWRO 10 for active demineralizing by gross ion exchange of the (AF) 120 in front of the reverse osmosis (RO) means 60 utilized in the invention for polishing the (AF) 120, the ionic exchange media of the Demineralizer step 30 accumulates more radioactive metal ions and the (RO) 60 is protected from accumulating greater amounts of radioactive dose and emitting greater amounts of gamma emissions from such radiation to personnel working in the area. Accumulation of more radioactive metal ions in the ion exchange media minimizes personnel dose as this media is remotely sluice to disposal containers and can be better shielded to minimize exposure while it is in service. Utilizing the ion exchange of demineralization 30 in front of the RO maximizes the utilization of the ion exchange media as the loading of as much radioactive metal ion as possible occurs. Using the ion exchange media after the RO, as done in the prior technology, often meant less than 60-70% utilization of the media and much lower loading of radioisotopes.

Also, Boron passage is maximized utilizing the RWRO method 10 to address radioactive liquids and fluids (AF) in a nuclear reactor while prior art technology, such as Dagard decreased the passage of Boron. Salts and nonradioactive metals are passed on through the RWRO system 10 as much as possible to reduce the volume of radwaste generated. In this regard the RWRO is utilized as the sole release point for liquid effluents from a nuclear power plant. Liquids must be released as a license condition for the operation of a nuclear plant. B10 (also referred to herein as the symbol $B_{10}$) is consumed as a neutron absorption agent to control the nuclear reaction and is converted to B11. The B10 thus must be replenished or added periodically so that the reactor may be properly controlled. This is done by either added highly enriched B or by replacing the consumed boron with fresh boron that contains a natural percentage of B10. Thus the consumed boron must be bled off to maintain the proper B10:B11 ratio in the reactor. In processing the (AF) 120 from the nuclear reactor, the present invention 10 acts to remove the B11 and assist the restoration of the proper B10:B11 ratio in the nuclear reactor. Then, in accordance with the needs for control of the nuclear reaction(s) B10 is added back or replenished in an acceptable form.

As set forth in FIG. 1, the steps included as a preferred embodiment of the invention 10 comprise:
Supplying an aqueous radioactive fluid in the form of an aqueous radioactive liquid or (AF) 120 to a supply area (10A);
Carbon filtering the (AF) (80);
Demineralizing by, through or as a function of gross ion exchange (or roughing through ion exchange) the (AF) (30);
Conveying the (AF) through a Reverse Osmosis unit RO (60), and dividing or separating the (AF) into a permeate liquid volume 120A and a reject liquid volume 120B (60A);
Recycling the reject liquid volume to the supply area or carbon filtering step, without chemical adjustment (140);
Conveying the permeate liquid volume to the Release Point for Liquid Effluents of the (AF) area or step 110 or for evaluation, appraisement or monitoring in area or step (110).

Figure 2:
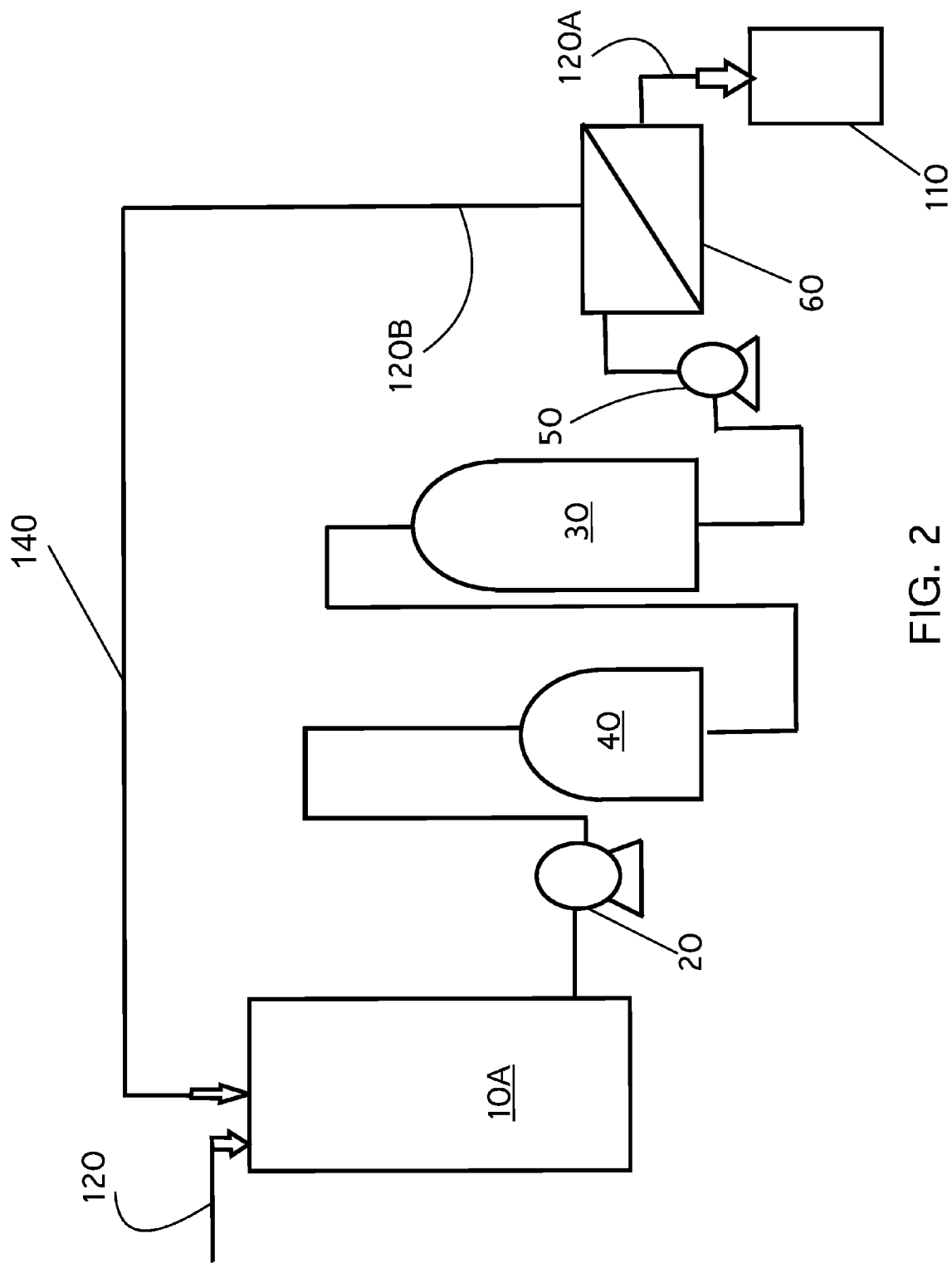
FIG. 2 is a flow chart of a method of treating an aqueous radioactive fluid in a nuclear reactor cycle or radwaste system according to another exemplary embodiment of the invention.

As set forth in FIG. 2, the steps included as a preferred embodiment of the invention 10 comprise:
Supplying an aqueous liquid or (AF) 120 to a supply area (10A);
Filtering the (AF) (40);
Gross Demineralizing the (AF) (30) by, through or as a function of gross ion exchange;
Conveying the (AF) through an RO (60), and dividing or separating the (AF) into a permeate liquid volume 120A and a reject liquid volume 120B (60A);
Recycling the reject liquid volume as a recycle stream, without chemical adjustment, to the supply area 10A or filtering step 40 (140);
(6) Conveying the permeate liquid volume to the Release Point for Liquid Effluents of the (AF) area or step (110).

Figure 3:
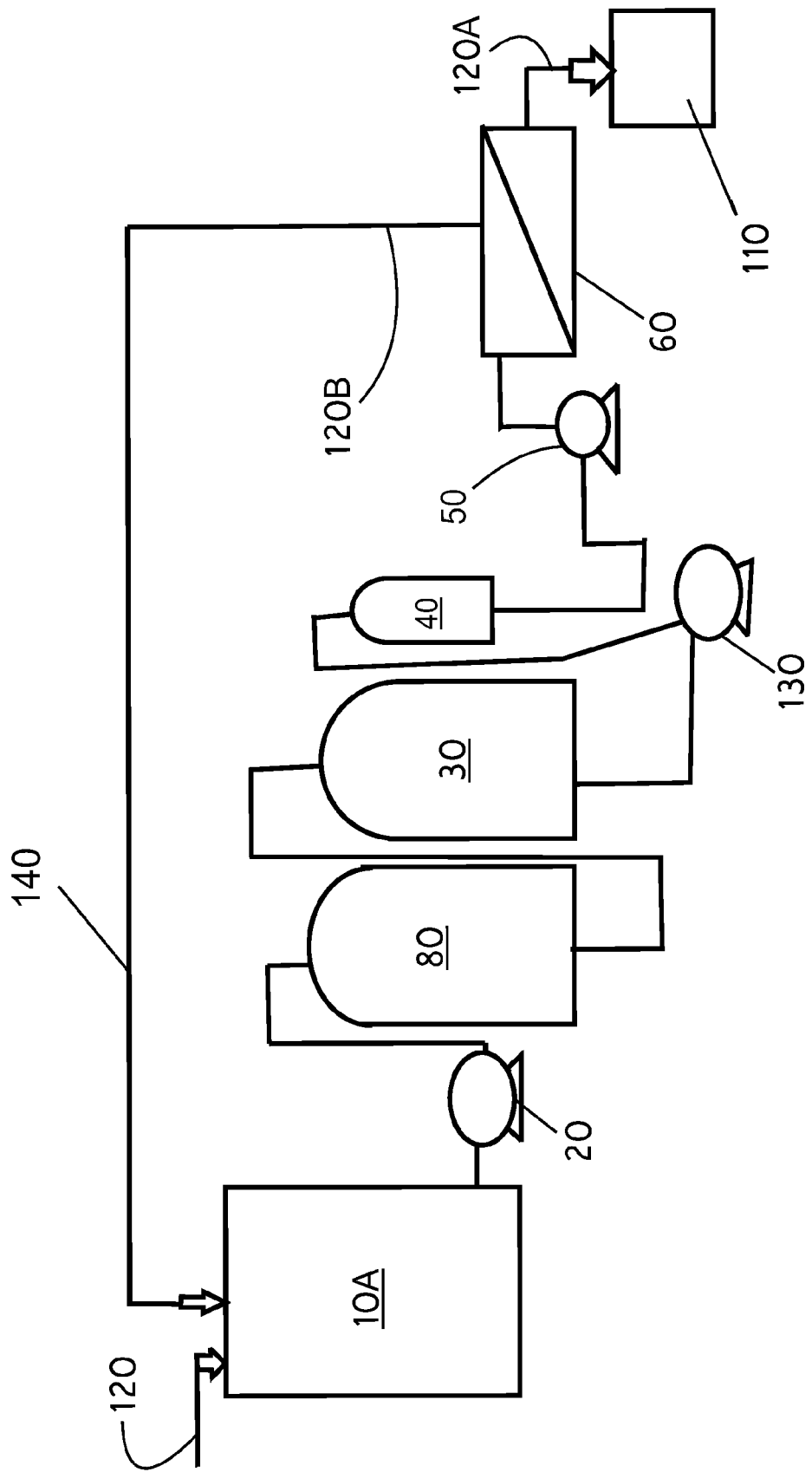
FIG. 3 is a flow chart of a method of treating an aqueous radioactive fluid in a nuclear reactor cycle or radwaste system according to another exemplary embodiment of the invention illustrating additional filtering aspects of the invention.

As set forth in FIG. 3, the steps included as a preferred embodiment of the invention 10 comprise:
Supplying an (AF) to a supply area (10A);
Carbon filtering the (AF) (80);
Demineralizing the (AF) (30) by, through or as a function of gross ion exchange;
Further filtering the (AF) (40) (removing from the (AF), among others, resin, carbon fines & foulants);
Conveying the (AF) through an RO (60), and separating the (AF) into a permeate liquid volume 120A and a reject liquid volume 120B (60A);
Recycling the reject liquid volume, without chemical adjustment, to the supply area (10A) or the carbon filtering step (80) (140);
Conveying the permeate volume to the Release Point for Liquid Effluents of the (AF) area or step (110).

Figure 4:
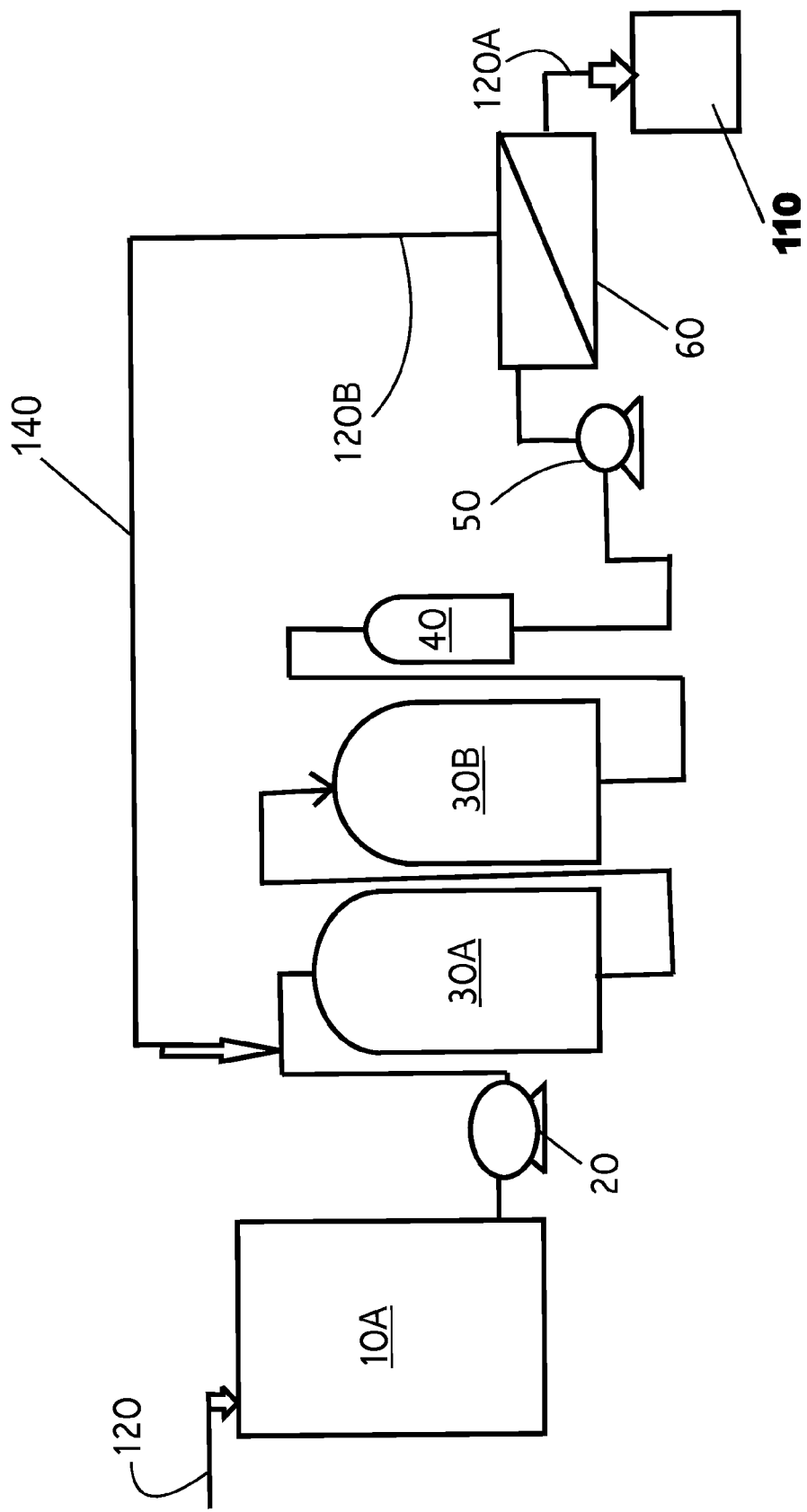
FIG. 4 is a flow chart of a method of treating an aqueous radioactive fluid in a nuclear reactor cycle or radwaste system according to another exemplary embodiment of the invention illustrating additional filtering and demineralizing aspects of the invention.

As set forth in FIG. 4, the steps included as a preferred embodiment of the invention 10 comprise:
Supplying an (AF) to a supply area (10A);
Demineralizing the (AF) in a first area or location (30A) by, through or as a function of gross ion exchange;
Further Demineralizing the (AF) by, through or as a function of gross ion exchange in a second area or location (30B);
Filtering the (AF) (40) (removing from the (AF), among others, resin, carbon fines & foulants);
Conveying the (AF) through an RO (60), and separating the (AF) into a permeate liquid volume 120A and a reject liquid volume 120B (60A);
Recycling the reject volume, without chemical adjustment, to the supply area 10A or the gross demineralizing step in the first area 30A (140);
Conveying the permeate liquid volume to the Release Point for Liquid Effluents of the (AF) area or step (110).

Figure 5:
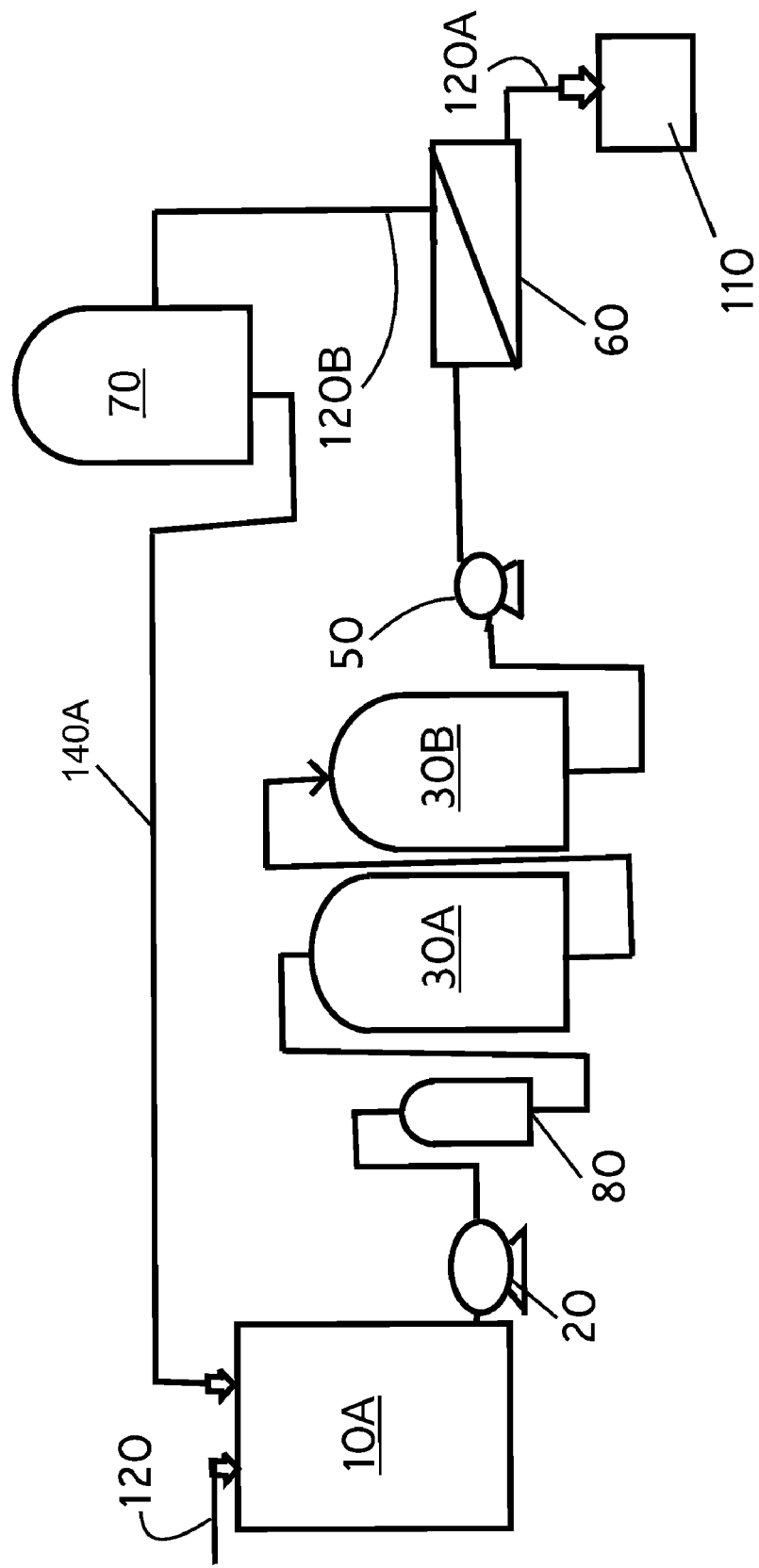
FIG. 5 is a flow chart of a method of treating an aqueous radioactive fluid in a nuclear reactor cycle or radwaste system according to another exemplary embodiment of the invention illustrating additional filtering and demineralizing aspects of the invention.

As set forth in FIG. 5, the steps included as a preferred embodiment of the invention 10 comprise:
Supplying an (AF) to a supply area (10A);
Carbon Filtering the (AF) (80);
Demineralizing the (AF) by, through or as a function of gross ion exchange in a first area or location (30A);
Gross Demineralizing the (AF) by, through or as a function of gross ion exchange in a second area or location (30B):
Conveying the (AF) through an RO (60), and separating the (AF) into a permeate liquid volume 120A and a reject liquid volume 120B (60A);
Passing the reject liquid volume 120B through a reject demineralizer system (70);
Recycling the reject volume to the supply area 10A or the carbon filtering step 80 (140A);
Conveying the permeate liquid volume to the Release Point for Liquid Effluents of the (AF) area or step (110).

Figure 6:
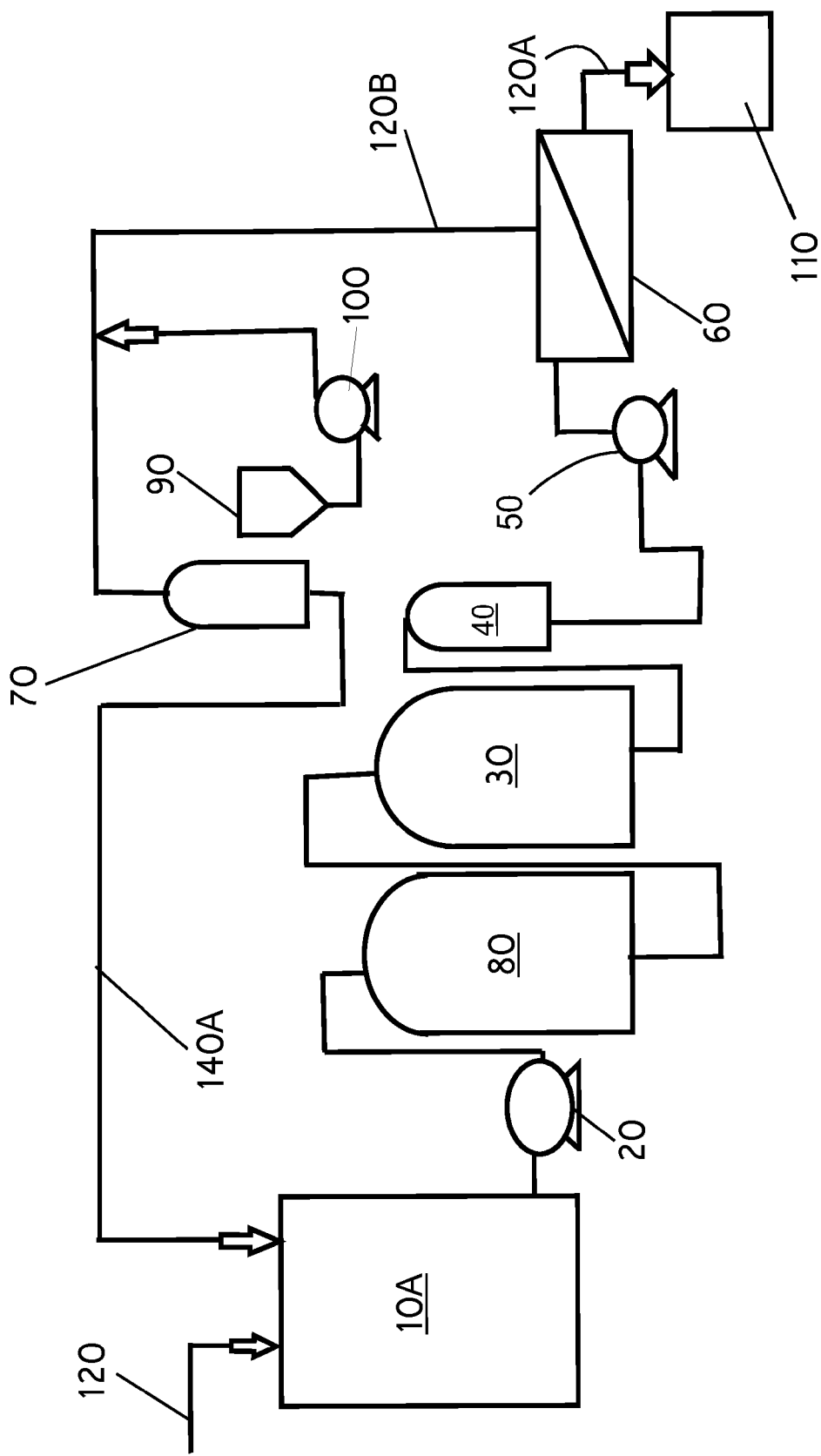
FIG. 6 is a flow chart of a method of treating an aqueous radioactive fluid in a nuclear reactor cycle or radwaste system according to another exemplary embodiment of the invention illustrating additional filtering, chemical addition and reject demineralizing aspects of the invention.

As set forth in FIG. 6, the steps included as a preferred embodiment of the invention 10 comprise:
Supplying an (AF) to a supply area (10A);
Carbon filtering the (AF) (80);
Gross Demineralizing the (AF) (30) by, through or as a function of gross ion exchange;
Further filtering the (AF) (40) (removing from the (AF), among others, resin, carbon fines & foulants);
Conveying the (AF) through an RO (60), and separating the (AF) into a permeate liquid volume 120A and a reject liquid volume 120B (60A);
Adding a chemical substance to the reject volume 120B or adjusting the pH of the reject volume (90);
Passing the reject liquid volume 120B through a reject demineralizer system (70);
Recycling the reject liquid volume 120B to the supply area or carbon filtering step 80 (140A);
Conveying the permeate liquid volume to the Release Point for Liquid Effluents of the (AF) area or step (110).

Figure 7:
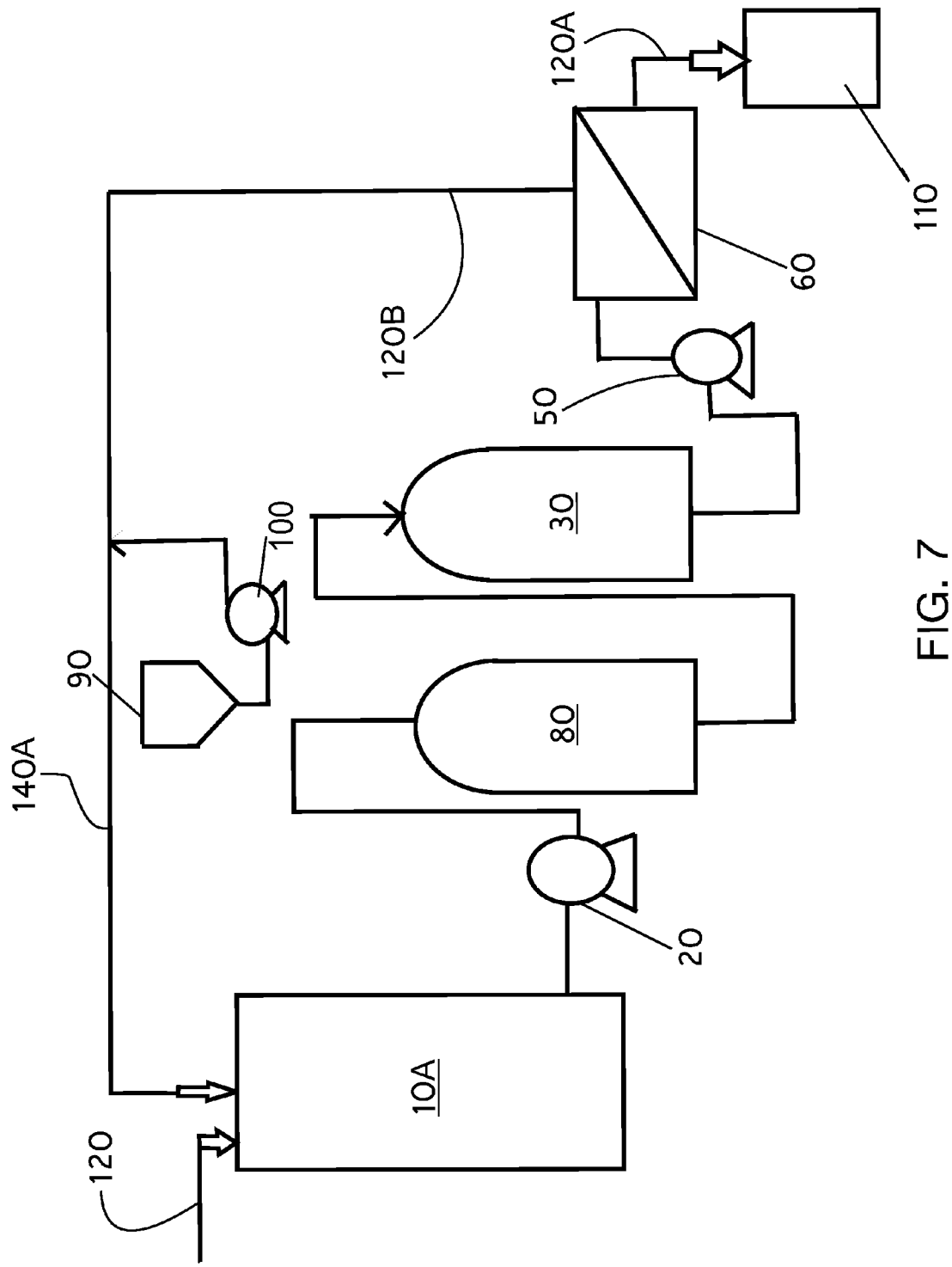
FIG. 7 is a flow chart of a method of treating an aqueous radioactive fluid in a nuclear reactor cycle or radwaste system according to the embodiment of FIG. 1 with and showing additional aspects of the invention regarding chemical addition and recycling.

As set forth in FIG. 7, the steps included as a preferred embodiment of the invention 10 comprise:
Repeating Steps Of FIG. 1, including Steps (1) through (4), therein, set forth above with regard to FIG. 1;
(The Added Part In FIG. 7:)
Adding a chemical substance to the reject volume or adjusting the pH of the reject liquid volume (90) among other reasons to assist when needed in converting boron constituents to boric acid;
Recycling the reject liquid volume to the supply area 10A or carbon filtering step 80 (140A);
Conveying the permeate liquid volume to the Release Point for Liquid Effluents of the (AF) area or step (110).

Figure 8:
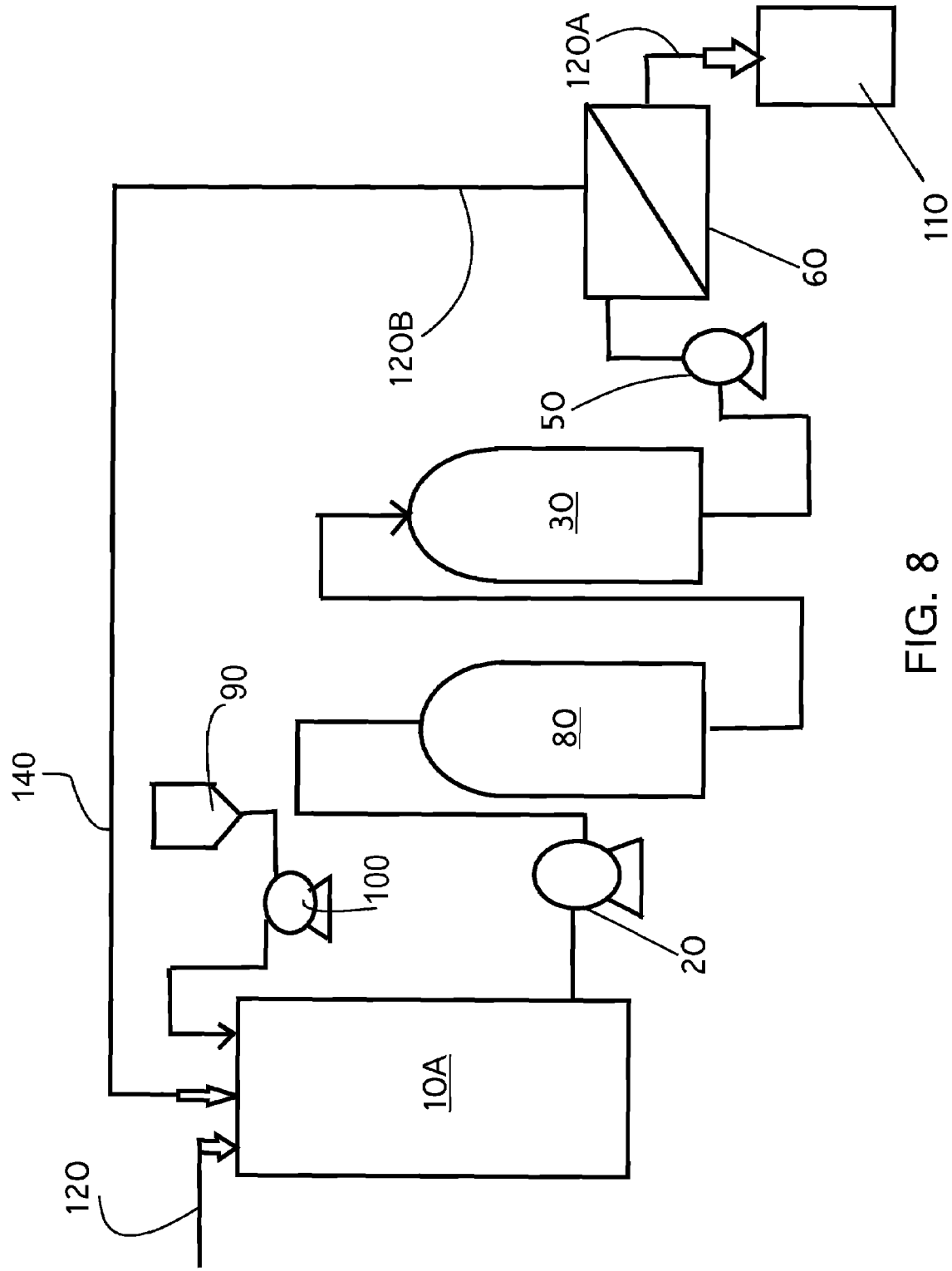
FIG. 8 is a flow chart of a method of treating an aqueous radioactive fluid in a nuclear reactor cycle or radwaste system according to the embodiment of FIG. 1 with and showing additional aspects of the invention regarding recycling and chemical addition.

As set forth in FIG. 8, the steps included as a preferred embodiment of the invention 10 comprise:

Repeating Steps Of FIG. 1, including Steps (1) through (4), therein, set forth above with regard to FIG. 1;

(The Added Part In FIG. 8:)

Recycling the reject liquid volume to the supply area (140);

Adding a chemical substance to the supply area (90);

Continuing recycle through the system's steps of (80), (30), (60) and (60A);

Recycling the reject volume 120B as a recycle stream, without chemical adjustment, to the supply area 10A or filtering step 40 (140);

(9) Conveying the permeate liquid volume 120A to the Release Point for Liquid Effluents of the (AF) area or step (110).

Figure 9:
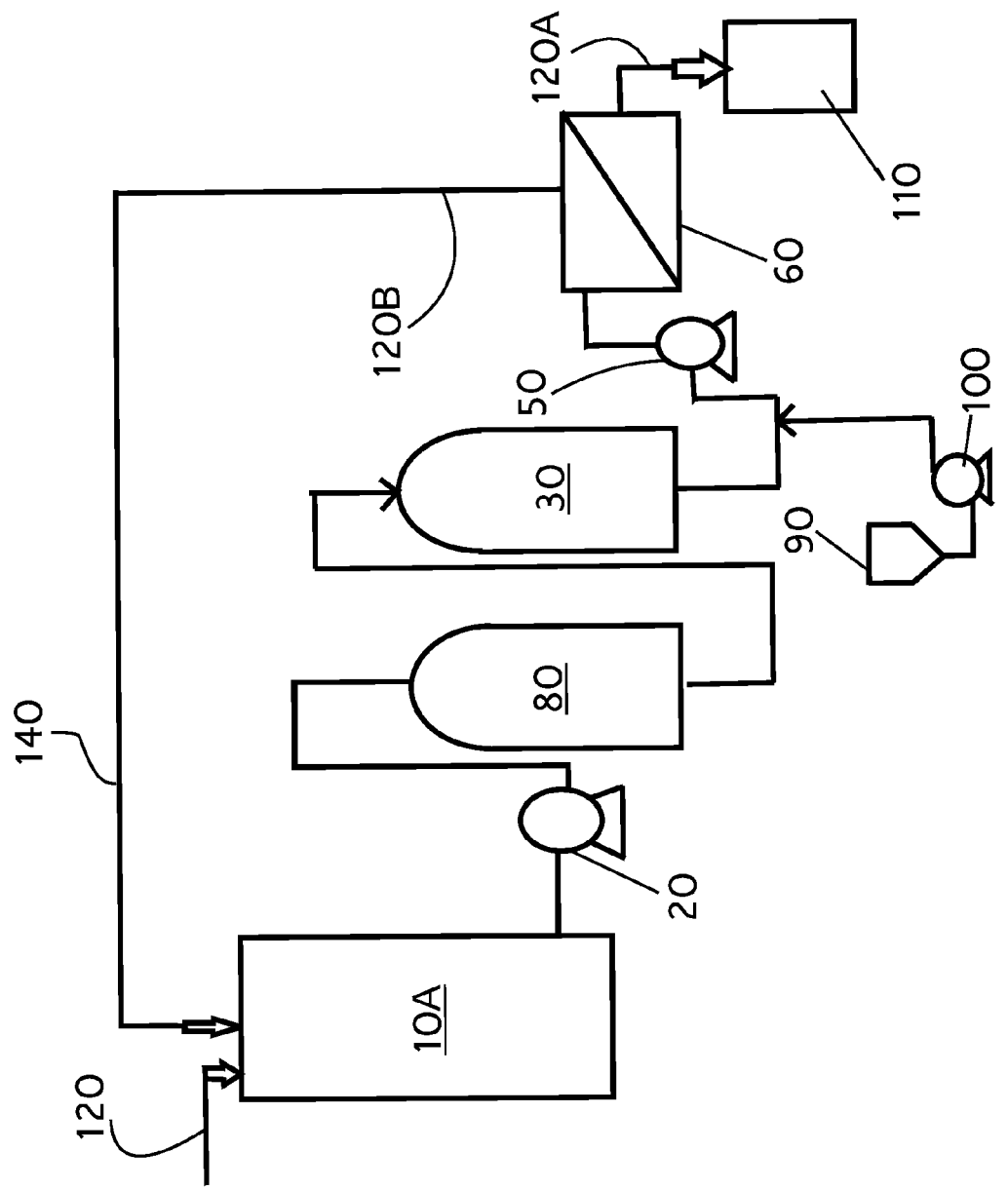
FIG. 9 is a flow chart of a method of treating an aqueous radioactive fluid in a nuclear reactor cycle or radwaste system according to the embodiment of FIG. 1 with and showing additional aspects of the invention regarding chemical addition.

As set forth in FIG. 9, the steps included as a preferred embodiment of the invention 10 comprise:

Repeating Steps Of FIG. 1, including Steps (1) through (3), therein, set forth above with regard to FIG. 1;

(The Added Part In FIG. 9:)

Adding a chemical substance to the (AF) (90) to assist among others in converting sodium borate to boric acid;

Conveying the (AF) through a Reverse Osmosis unit (RO) 60, and dividing the (AF) into a permeate liquid volume 120A and a reject liquid volume 120B (60A);

Recycling the reject liquid volume 120B to the supply area 10A or carbon filtering step 80 (140);

Conveying the permeate liquid volume to the Release Point for Liquid Effluents of the (AF) area or step (110).

Figure 10:
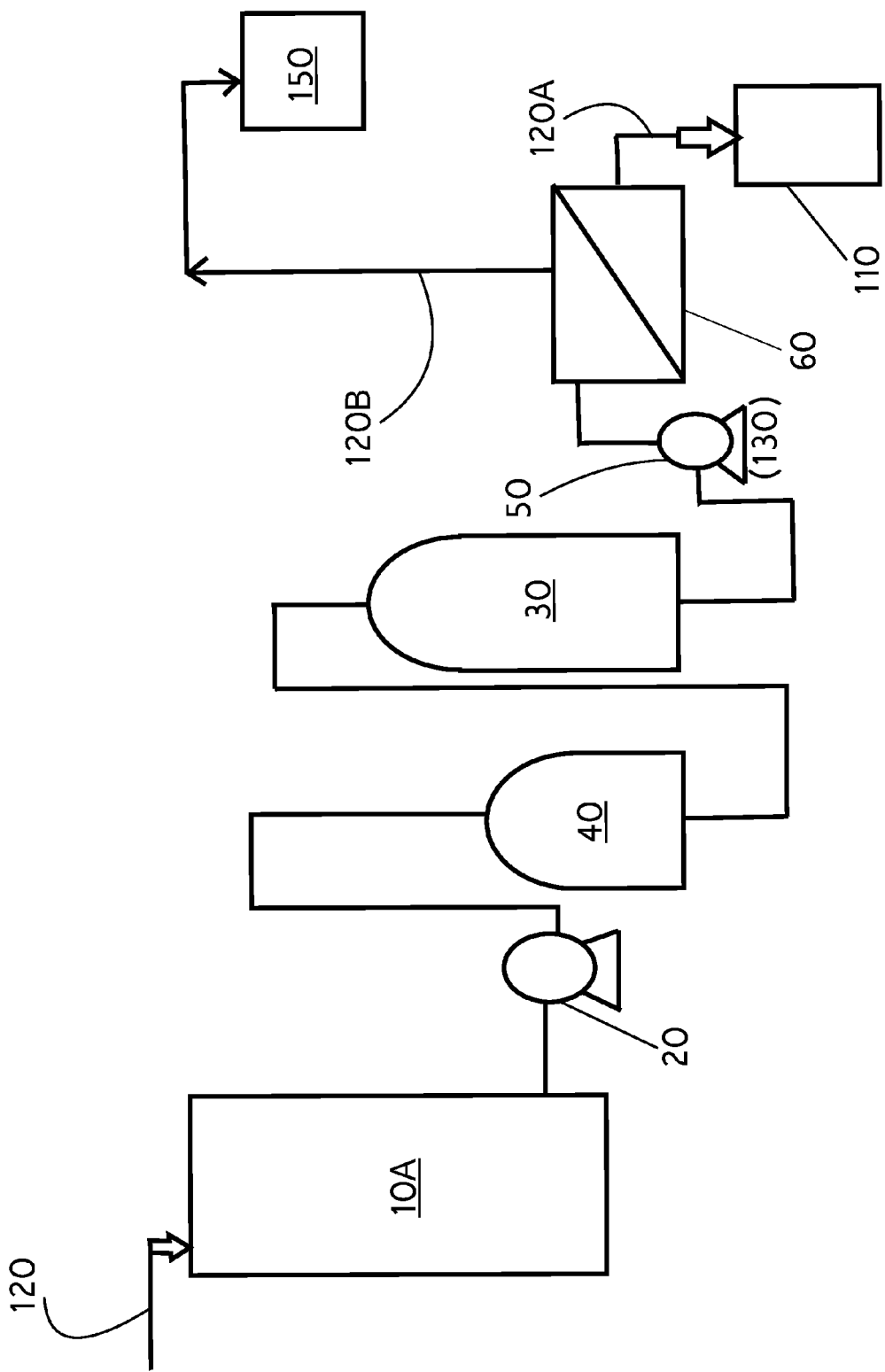
FIG. 10 is a flow chart of a method of treating an aqueous radioactive fluid in a nuclear reactor cycle or radwaste system according to the embodiment of FIG. 2 with and showing additional aspects of the invention regarding conveyance of the reject liquid volume to a holdup area.

As set forth in FIG. 10, the steps included as a preferred embodiment of the invention 10 comprise:

Repeating Steps Of FIG. 2, including Steps (1) through (4), therein, set forth above with regard to FIG. 2;

(The Added Part In FIG. 10:)

Conveying the reject liquid volume 120B to a Holdup Area 150;

Conveying the permeate volume to the Release Point for Liquid Effluents of the (AF) area or step 110, for evaluation, monitoring or further use.

Figure 11:
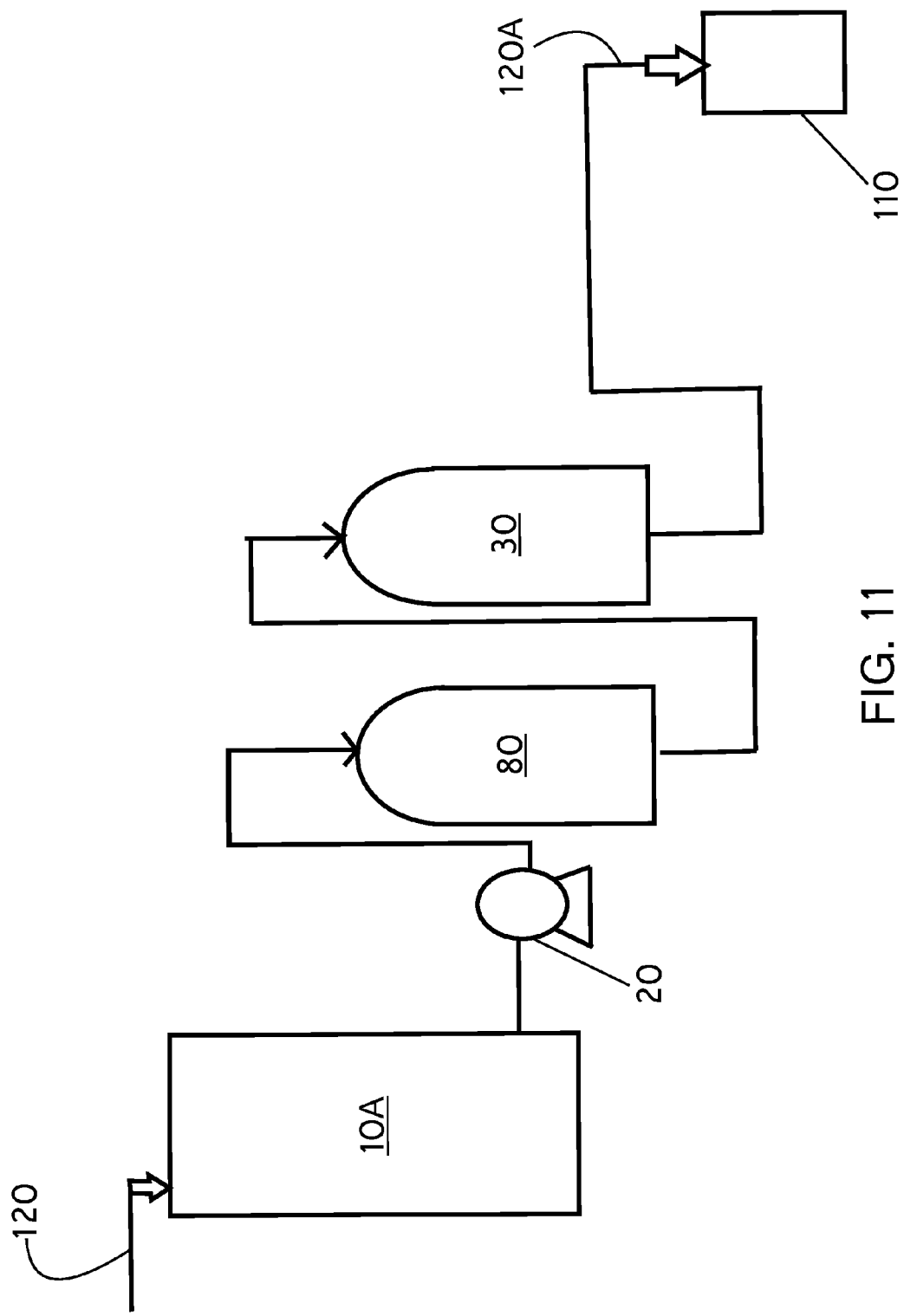
FIG. 11 is a flow chart of a method of treating an aqueous radioactive fluid in a nuclear reactor cycle or radwaste system according to the embodiment of FIG. 1 with and showing additional aspects of the invention regarding bypass of the RO step.

As set forth in FIG. 11, the steps included as a preferred embodiment of the invention 10 comprise:

Repeating Steps Of FIG. 1, including Steps (1) through (3), therein, set forth above with regard to FIG. 1;

(The Added Part In FIG. 11:)

(4) Bypassing an RO 60, and conveying a wastestream to the Release Point for Liquid Effluents of the (AF) area or step 110 for evaluation and release.

With regard to the embodiment of FIG. 11, it should be noted that occasionally water is presented in which certain components are of a concentration that cannot be processed through the RO without an unacceptable risk of membrane fouling. These waters, held to be a small percentage of the time and volume, may require processing through the IX but bypassing of the RO unit. In these instances, the invention still retains its value in the overall retention of contaminants and substantial reduction in waste volumes generated over standard operations of an RO unit.

In those instances when all contaminants of interest are not present or have been removed by the IX system, the RO can be bypassed. This permits the discharge of the inventory of species of no environmental concern (i.e. boron or silica) that otherwise may concentrate up in the current batch of (AF). Thereafter, the RO may then be returned to the normal polishing mode.

As indicated above, It is an object of the present invention to provide a permeate stream and a reject stream, so that the reject is recycled back to the front of a system of which it is a part of, so that the removal percentage of demineralizers employed in such a system is great enough to prevent excess buildup of most all isotopes and other fouling chemicals. The demineralizers are typically effective at removing >90% of the dissolved components in the water except boron and silica. Boron is not usually an environmental discharge concern and can be utilized if recycled. If silica is present in excessive quantities additional treatment may be required although in many cases sufficient passage in the membranes is possible when feed concentrations are low.

The supply area 10A is provided, in preferred embodiments, with one or more tanks for collection of liquid for batch processing. Continuous processing is possible if sufficient waste volumes are available. The tank is capable of some solid/liquid separation due to the quiet nature between processing batches where natural settling and coagulation occurs. These solids are either retained in the tank for later removal or are collected in downstream filters. Additionally, the supply area 10A contains in preferred embodiments a method of mixing the recycle and the influent so that the supply is more homogeneous.

In recycle to the supply area, chemical and physical (i.e., coagulation, precipitation) changes can occur just through the concentration process, and further oxidation would generally occur in the supply tank as exposure to air and other potential sources of water occurred over time or as a part of aging.

In related preferred embodiments the supply area 10A is utilizable as a point where internal recycle streams may re-enter the processing stream. The recycle stream may also enter after the supply area 10A. Also, in preferred embodiments, the recycle may enter a future supply area to permit further reaction time and exposure (or aging) with regard to other types of wastewater 120. This wastewater is then processed at a later time.

In this regard, as stated above, it is an object of the present invention to gain the many advantages of rejecting back to a radwaste system of a nuclear reactor plant, facility or site with which it is associated; including, but not limited to: the reduction of activity rejected and returned to the radwaste system of the nuclear reactor plant; the reduction of waste classification of concentrates and/or resulting dried solids; the maximization of resin usage by exposing resin to a higher influent activity concentration; prevention of return to the plant or environmental discharge of difficult to remove isotopes; the use scavenging of targeted isotopes, such as antimony, in a smaller waste stream, then provided; and the decrease on osmotic load through the increase of permeate flow. It should be noted that occasionally water is presented for which certain components build up in the system that cannot be cost effectively removed. This may require a periodic discharge of the reject or a bypassing of the RO unit. This is held to be a small percentage of the time and volume and the invention still retains its value in the overall retention of contaminants and substantial reduction in waste volumes generated over standard operations of an RO unit. The initial influent in preferred embodiments is the waste stream 120 from a facility that enters the Supply Area (10A). This waste stream determines the waste system processing requirements and volume-wise usually consists of >90% of the flow into the supply area with the recycle stream (120B, 140 or 140A) making up the balance of the flow into the Supply Area 10A.

The RO system 10 has a preferred method of operation where the recycle stream does not materially impact the influent concentrations and volumes, and there is a system mass balance throughout the RO system 10. The recycle stream concentrations are preferably near the concentrations of the influent stream so as to not significantly impact the requirements of the overall system. A mass balance can always be conducted around the system to assure that no accumulation of any dissolved components is occurring. The system is designed so that constant removal efficiency is maintained across demineralizers and filters so that no significant buildup in dissolved constituents occurs within the system that would result in the system requiring discharge of a separate liquid waste stream. This is the main differentiation with a standard RO system whether it is located ahead or behind a demineralizer system. The reject from previous systems always generated a liquid concentrate waste stream that had to be disposed at a significant cost. Importantly, the method and system of the present invention generates no additional waste streams that are required to be disposed at a non-environmental location and/or to be treated by evaporation, solidification or off-site transportation; yet produces higher quality effluent.

TABLE 1

| Equipment (#) | Flow Rate Inlet (gpm) | TDS Inlet (ppm) | TDS Removal (ppm-gal) | TDS Outlet (ppm-gal) | TSS Inlet (ppm) | TSS Removal (ppm-gal) |
|---|---|---|---|---|---|---|
| 1  | 100 | 1000 |        |      | 9.8 |     |
| 3  | 100 | 1000 | 98,000 | 1000 | 0   |     |
| 4  | 100 | 1000 |        |      | 9.8 | 980 |
| 6  | 100 | 10   | 1000   | 0    | 0   |     |
| 11 | 98  | 0    |        |      | 0   |     |
| 12 | 98  | 1000 |        |      | 10  |     |
| 14 | 2   | 500  |        | 1000 | 0   |     |

Table 1, above, shows an example of concentrations of dissolved solids (TDS) and suspended solids (TSS) as they are removed and transferred through the system. This indicates a steady state condition that eventually exists in a properly operated system.

The conveyance subassembly or means 20, in preferred embodiments, is a means of conveying the AF 120 through subsequent process vessels and piping. This is usually supplied through a pump; but pressurization of vessels, gravity or other means can be employed.

Mechanical filtration 40 is applicable to remove particulate, if present, prior to the demineralizer 30, reverse osmosis unit 60, or carbon filter 80. Many types of mechanical filtration can be utilized including but not limited to bag filters, cartridge filters, wound filters, membrane filters, sintered metal and others. The mechanical filters provide protection to the RO membranes to prevent particulate fouling in the spacers or on the membrane surfaces; therefore, reducing effective flow and flux areas.

The demineralizer 30, or plurality thereof, are normally pressure vessels that contain a media capable of ion exchange or ion capture of dissolved and particulate matter. Removal in such a demineralizer 30 is theoretically predicated on the phenomenon where dissolved, charged ions captured thru their opposite charge to a fixed charge on the media, thus lower this ion concentration in solution. A number of other media are also available and may be used to capture specific, sized or targeted ions through a mechanism that combines a much lower ionic charge; but utilizes chambers in the material that have specific size that approximate the physical size of the ion to cause a capture of this size ion. An ion large in size cannot enter; and smaller ions that enter these spaces do not have enough contact area to affect a charge capture, so they are eventually released.

Some ion exchange material also has the potential to remove organics through an adsorption process on the surface of the media. Other media is also designed to capture fine particulate within the media due to high macro-porous area where its inner, tortuous path causes small particles to be removed. Other larger particles can also be removed at inter-particle contact points in the media.

These and other types of media can be employed within the spirit of the present invention. In this regard, the present method of the RWRO system 10 permits scavenging of targeted isotopes, such as Cesium, Cobalt and Antimony; and possibly Iron, Iodine, or others; by virtue of the present system's ability to utilize selective ion exchange media with regard to a smaller and more concentrated waste stream. Some isotopes, such as Antimony (Sb), are not held as strongly to normal ion exchange media. This may require the use of special ion specific media that is often ten times more expensive but more effective through a much longer bed life and lower disposal volume. By limiting the stream flow rate that must be treated, the volume of selective media can be greatly reduced making the cost of such media much lower. The reject flow rate is normally 2-10% of the feed flow rate in the present RWRO system 10. Additionally, in conventional processes, Tritium is not removed by either RO or ion exchange to an appreciable extent.

The importance of tritium is that if the present RWRO system is used for recycle, the tritium which usually exits the plant in the released water, is recycled to the plant where it is allowed to decay as it has a half-life of 12.5 years. The highest isotopic discharge from any PWR plant is tritium, which is usually 3-6 orders of magnitude above any other isotope. Currently the utilities must report the discharge of hundreds to thousands of curies of tritium to the local waterways, as compared to the discharge of 0.1 to 1.0 curies to little as 0.01 curies of all other isotopes. Local and downstream residents fear that this will enter their drinking water and will adversely affect their health. Accordingly, the ability of the present method 10 to concentrate such isotopes or elements on recycle and utilize higher quality and more selective ion exchange media in passage through the present system, greatly improves the ability to eliminate or segregate such materials from influent waste streams.

As indicated above, the invention includes a method of maximizing resin utilization, more particularly polishing a radioactive aqueous liquid or (AF) supplied from the a radwaste system of a nuclear reactor to a system at a supply area and selectively scavenging for targeted isotopes; by permitting greater concentrations thereof and exposing filter media and resin to a higher influent activity concentration. This also permits some bleed through of the resin that is ordinarily not permitted if a polisher is not present at the end of the train.

The purpose of the gross demineralizer 30 in this invention is to reduce the ion concentration prior to the RO 60 to permit effective removal of the waste material or radwaste to produce water that is dischargeable to the outside ambient environment.

Some of the important species removed by the gross demineralization (or demins) step that could easily result in fouling are calcium, magnesium, sulfate and carbonate. As indicated in part above, the effective range of removal is dependent upon the nature of the subject ionic species, and varies between about 70 and about 99.99% removal with most species being in the upper 90% removal. Therefore, in utilizing the present invention, a decontamination factor (DF) of from about 7 to about 10,000 is possible.

Without the presence of an upstream gross demineralizer 30 the membranes in the Polishing RO 60 would have the potential of rapid fouling due to the precipitation of saturated species in the boundary layer of the membranes.

The Polishing RO 60 can also be an electrodeionization (EDI) assembly or process which utilizes membranes and electrical charge to continuously regenerate ion exchange media. Those skilled in the art will understand the nature and function of a demineralizer and those available on the market.

The EDI generates the same two effluent streams, 120A and 120B.

However, in preferred embodiments of the RWRO system 10, where regular gross demineralization is used, the creation of acid conditions by deployment of cation resin to reduce pH adjustment, improves BA passage. The use of hydrogen form cation resin before the RO 60 results in lowering of the pH which converts more of the boron to acid form which increases the passage for either recycle or discharge. Therefore, this acts in reducing the boron captured for disposal.

In this regard, therefore, in some of the preferred embodiments of the invention 10, further benefit is achieved by utilizing the hydrogen form resin immediately before the Polishing RO 60 without any further treatment. In this case the use of a hydrogen form resin can again lower the pH. Conversion to boric acid improves the passage of boron thus reducing waste generation and provides for better recovery of boron if recycle within the steps of the present method is chosen.

This would, for example, facilitate conversion of any sodium borate contained in the (AF) to boric acid. As indicated, conversion to boric acid improves the passage of boron thus reducing waste generation and provides for better recovery of boron during recycle to the supply area 10A, demineralizing the (AF) by gross ion exchange (30, 30A, 30B) and other steps associated with these steps and locations as set forth in discussion of the preferred embodiments and descriptions as to drawing illustrations FIGS. 1-11.

Due to pressure drop in the system or limitations on pressure boundaries, a further conveyance means or booster unit or pump 130 is available for use in preferred embodiments of the invention 10; and, by virtue of the work to be performed, may be required.

The use of a reverse osmosis (RO) step 60 frequently requires significant pressure to overcome osmotic pressures. Therefore, a dedicated reverse osmosis conveyance unit or pump 50, or like system, is used to supply the requirements of the Polishing RO 60.

The Polishing RO 60 of the RWRO system 10 can utilize either polyamide or cellulose acetate membranes, as exemplary equipment, to provide the proper retention and passage of the desired isotopes depending upon the application, as well as a number of other specialized membrane units or systems. As discussed and illustrated the RO 60 is preferably, as it stands in and of itself, a single stage RO system or unit, in distinction with various prior art systems, units or methods.

The polishing reverse osmosis unit 60 is the polishing unit in the overall system of the invention. Any species that are not permitted for either discharge or reuse are rejected and sent back for reprocessing within the steps of the present method without generating a new waste stream. Upon return, the steps of the present method and system are permitted another chance to remove the required constituents in a more concentrated form or in an altered more easily removed state.

In this regard, the following terms and definitions should be noted:

"Recycle", as utilized herein, and referenced as a part of method steps of the present invention herein (120B, 60A, 140, 140A) is deemed to be a liquid stream contained within the overall RWRO system 10 (Supply/Filter/Demin/RO steps) where a stream is sent back to a previous area in the system such as the supply area 10A or demineralizing ion exchange step 30, and, as indicated herein, merged with another stream, or in entering or being conveyed to a temporary holding container for later introduction into the same group of systems. "Reuse", as utilized herein, is deemed to be an effluent stream from the system where the produced stream is again used by the nuclear reactor facility that initially generated the waste stream rather than being discharged to the environment. "Discharge", as utilized herein, is deemed to be an aqueous liquid stream that leaves the inventions system and is released to the environment (i.e., river, lake, ocean, sanitary sewer system, etc.) after meeting discharge requirements. "Waste stream" (120), as utilized herein, is deemed to be a liquid accumulation of material that must be disposed as a regulated material for disposal at a different offsite location. These may include radiological, hazardous, and mixed liquid or fluid wastes from a nuclear reactor process or cycle or radwaste system or nuclear reactor wastewater plant. The term "roughing" means gross or removing the major portion of the ions, as distinguished from the term "polishing" which pertains to removing only the last remaining ions.

The Release Point for Liquid Effluents of the (AF) area or step 110 is preferably an ambient environmental area outside the nuclear reactor site. This area or step 110 can also be an evaluation, appraisement or monitoring area such as a tank or reservoir means which comes to house a permeate liquid volume 120A separated from the AF 120, after the polishing RO 60, where samples are taken and evaluated for use, storage, recycle or later further use. However the area 110 can also be an area in the pipeline or conveyance means, within the scope of the invention, where continuous radiation isotope monitoring is conducted prior to environmental release.

From the Release Point for Liquid Effluents of the (AF) area or step 110 the water is preferably, either recycled or discharged to the outside ambient environment; but can be directed, as indicated, by example herein, to other uses.

One such other use includes, without limitation, conveyance of the reject liquid volume 120B to the holdup tank or area 150, shown by example, schematically, in FIG. 10. Various types of such holdup tanks 150 can be utilized, and placed at different positions in the RWRO system 10, in preferred embodiments thereof. The tanks 150 are generally put on recirculation prior to pumping and often during pumping so the contents are well mixed prior to delivery back to another part of the system 10. The reject liquid stream 120B usually enters the tanks as part of the floor drain collection system of the plant so it is already mixed with other nuclear reactor plant or nuclear reactor radwaste system water prior to entering the tank.

The reject demineralizer assembly 70 functions the same as the gross demineralizer assembly 30 described above. However, in this case only the reject liquid stream or volume 120B is passed through the assembly 70. The smaller volume and higher ionic concentrations change the equilibrium to more favorable conditions. The lower flow rate also permits the use of smaller quantities of media which make specialized, more expensive media more feasible. It is within the scope and spirit of the invention, in this regard to vary retention time and flow characteristics to address given jobs or waste substances being processed.

With respect to the chemical supply tank 90, there are times, in processing the permeate and reject volumes 120A and 120B, respectively, when a chemical adjustment may be required. The chemical supply tank 90, in preferred embodiments, can be in the form of a feed tank or chemical feed container or other supply means. It is utilized in preferred embodiments of the invention to facilitate pH adjustment, precipitation of specie(s) and transformation of species to alternate chemical forms. In so utilizing the chemical supply tank 90, the introduction of a chemical substance or component can be facilitated to occur any where from the supply area 10A, between any of the steps or components in the RWRO system 10, prior to Polishing RO 60; and in any location where conveyance of the reject liquid stream 120B occurs in preferred embodiments of the invention. The chemical supply conveyance or pump 100 is utilized in the present invention to inject a chemical feed into the system from the supply tank 90, or other suitable chemical supply source. The conveyance 100 can include a gravity means, a pressurized vessel and various types of pumping; as well as other means of conveying or making an adjustment chemical available to the RWRO system 10 from the chemical supply tank 90.

The invention materially enhances and protects the quality of the environment, as set forth above; by reducing the volume of the radwaste for use, disposal or storage, and generating only one additional stream containing the water, salts and non-radioactive components of the method's processing in a form that can safely be returned to the environment separate and apart from the nuclear reactor site, thus contributing to the restoration or maintenance of the ground and ground waters of the environment.

There are many commercially available units of equipment which can be utilized to facilitate the steps of the Method of the present invention 10, which will be understood by those skilled in the art. It should be understood that the foregoing description is only illustrative of the invention. Various alternatives and modifications in the structural and functional features of the feed means can be devised by those skilled in the art without departing from the invention. Accordingly, the present invention is intended to embrace all such alternatives, modifications and variations which fall within the spirit and scope of the appended claims.

The embodiments of the invention in which an exclusive property or privilege is claimed are defined as follows:

1. A method of processing at least a part of an aqueous radioactive fluid or (AF) removed from a volume of such fluid in a nuclear reactor to selectively capture or remove radioactive isotopes in a reduced quantitative package substantially devoid of solid salt constituents, to minimize the amount of radwaste generated for evaluation, evaporation, solidification, off-site transportation or later activity and to assist in revitalizing the neutron absorption capacity of the volume of such fluid in the nuclear reactor by removing boron in the form of $B_{11}$ therefrom as a part of said method, when $B_{10}$ is later added to such fluid; said method having at least one step of conveying a liquid volume of the (AF) to a release point for liquid effluents of the (AF) in an ambient environment apart and outside of the nuclear reactor for separately carrying away boron constituents in the (AF) in said assist in revitalizing said neutron absorption capacity; the (AF) being directed to a supply area at the nuclear reactor; said method comprising the steps of:
   (a) demineralizing the (AF) by gross ion exchange for reduction of the amount of radioactive isotopes passing therethrough while substantially permitting salts, boron and nonradioactive substances to pass through and lowering the pH of said substances to pass through such that substantially most of the boron can later pass through an RO membrane and then
   (b) polishing by reverse osmosis or (RO) of the (AF) and
   (c) dividing the (AF) into a first liquid volume or permeate liquid volume and a second liquid volume or reject liquid volume, the permeate liquid volume having from about half to substantially none of the radioactive isotopes present in the (AF) and a substantial amount of any monovalent salts, boric acid and water present in the (AF), and the reject liquid volume having at least an increased fraction of the boron, salts and radioactive isotopes present in the (AF);
   (d) recycling and feeding the reject liquid volume back into step (a) for removing generally most of the radioactive isotopes to generate a demineralizer effluent, and conveying the permeate liquid volume in said at least one step of conveying a liquid volume of the (AF) to the release point for liquid effluents of the (AF), and dividing the demineralizer effluent into a further permeate liquid volume having substantially none of the radioactive isotopes present in the demineralizer effluent and having a reduced volume relative to said recycling and feeding the reject liquid volume, and a further reject liquid volume having any of the radioactive isotopes remaining in the demineralizer effluent; and
   (e) conveying the further permeate liquid volume in said at least one step of conveying a liquid volume of the (AF) to the release point for liquid effluents of the (AF).

2. The method of claim 1, wherein, prior to step (a), a step comprising at least one prefiltering step selected from a group consisting of: the step of filtering the (AF), the step of filtering the reject liquid volume on recycle, the step of carbon filtering the (AF) and the step of carbon filtering the reject liquid volume on recycle.

3. The method of claim 2; wherein, as a part of step (d), a sub-step comprising at least one sub-step selected from a group consisting of: the sub-step of the reject liquid volume being recycled to said step (a), the sub-step of recycling the reject liquid volume to the supply area, and the sub-step of recycling the reject liquid volume to a radwaste holdup area.

4. The method of claim 1; wherein, as a part of the step (d), a sub-step comprising at least one sub-step selected from a group consisting of: the sub-step of recycling the reject liquid volume to the supply area and the sub-step of adjusting the pH of the reject liquid volume.

5. The method of claim 2, wherein, as a part of step (d), a sub-step comprising at least one sub-step selected from a group consisting of: recycling the reject liquid volume through the carbon filtering step, said step (a), said step (b) and said step (c); recycling the reject liquid volume back to the supply area; and recycling the reject liquid volume to a radwaste holdup area.

6. The method of claim 5, wherein, as a part of the sub-step of recycling the reject liquid volume back to the supply area, at least one further sub-step selected from a group consisting of: adding a chemical substance to the reject liquid volume to precipitate silica therefrom, before said reject volume reaches said supply area; and adjusting the pH of said reject liquid volume.

7. The method of claim 1, wherein, after step (a), at least one step selected from a group consisting of: adding a chemical substance to the (AF) to precipitate silica therefrom; removing any resin, carbon fines and other foulants contained in the (AF); further demineralizing the (AF) in a separate area from that of said step (a); further demineralizing the (AF) in a separate area from that of step (a) and following thereafter with a step of filtering the (AF); and further demineralizing the (AF) in a separate area from that of step (a) following thereafter with a step of filtering the (AF) wherein at least a part of the step of filtering the (AF) comprises a sub-step of removing resin, carbon fines and other foulants contained in said (AF).

8. The method of claim 1, wherein, prior to step (b), a step of converting any sodium borate contained in the (AF) to boric acid.

9. The method of claim 2, wherein, before said carbon filtering step, the step of adding a chemical substance to the (AF) in the supply area to precipitate silica therefrom.

10. The method of claim 7, wherein, as a part of step (d), at least one sub-step selected from a group consisting of: recycling the reject liquid volume through step (a), said further demineralizing step, said step of filtering the (AF), step (b) and step (c); recycling the reject liquid volume to the supply area; and recycling the reject liquid volume to a radwaste holdup area.

11. The method of claim 10, wherein, after steps (b) and (c), a step selected from a group consisting of: adding a chemical substance to the reject volume to precipitate silica therefrom; adjusting the pH of the reject liquid volume to convert boron constituents to boric acid; and adding a chemical substance to the reject liquid volume to precipitate silica therefrom, followed by reject demineralizing said reject liquid volume.

12. The method of claim 2, wherein, after step (a), a step selected from a group consisting of: further filtering the (AF); further filtering the (AF) where at least a part thereof includes a sub-step of removing resin, carbon fines and other foulants contained in said (AF); further filtering the (AF), where, thereafter, at least a part of step (d) includes the sub-step of recycling the reject volume through the carbon filtering step, step (a), a further filtering step, step (b) and step (c); further filtering the (AF), where, thereafter, at least a part of step (d) includes a sub-step of recycling the reject liquid volume to the supply area; and further filtering the (AF), where, thereafter, at least a part of step (d) includes a sub-step of recycling the reject liquid volume to a radwaste holdup area.

13. The method of claim 2, wherein, after step (a), a step selected from a group consisting of: further demineralizing the (AF) in a separate area from that of step (a); further demineralizing the (AF) in a separate area from that of step (a), and after step c) and before step (d) reject demineralizing the reject volume; further demineralizing the (AF) in a separate area from that of step (a), and as a part of step (d) recycling the reject volume to the supply area; further demineralizing the (AF) in a separate area from that of step (a), and as a part of step (d) the sub-step of recycling the reject volume through the carbon filtering step, step (a), the further demineralizing step, step (b) and step (c); further demineralizing the (AF) in a separate area from that of step (a), and after the step of adding a chemical substance to the reject liquid volume to precipitate silica therefrom, and as a part of step (d), the sub-step of recycling the reject liquid volume through the carbon filtering step, step (a), the further filtering step, step (b) and step (c); further demineralizing the (AF) in a separate area from that of step (a), and as a part of step (d) the reject liquid volume being recycled to the supply area; and further demineralizing the (AF) in a separate area from that of step (a), and as a part of step (d) recycling the reject liquid volume to a radwaste holdup area.

14. The method of claim 1, further comprising in addition to step (e) conveying the further reject liquid volume to a selected area for analysis and evaluation of, and as to, further actions selected from a group consisting of reuse, disposal, recycle, discharge to the release point for liquid effluents of the (AF) and holdover.

15. The method of claim 1, wherein as a part of step (d) directing the further reject liquid volume to at least one successive recycling where each said successive recycling comprises recycling the reject liquid volume to the supply area and contemporaneously adding and combining with the further reject liquid volume in the supply area further amounts of new (AF) of the nuclear reactor to bring the combination to equilibrium or a steady state condition to form a recycled feedstream, and passing the recycled feedstream through, and repeating, said steps (a), (b), (c), (d) and (e) of the method.

16. The method of claim 1, wherein as a part of step (b), particularly polishing the (AF) by reverse osmosis or (RO) for selectively scavenging for targeted isotopes and other dissolved and colloidal materials when present and remaining, and wherein said selectively scavenging for targeted isotopes in step (b) includes the step of adjusting said reverse osmosis through selecting and using ion exchange media for selective sensitivity for respective isotopes from a group consisting of Antimony, Cobalt, Cesium, Iodine, Tellurium, Manganese, Iron, Silver, Chromium, and Niobium.

17. The method of claim 1, wherein as a part of said when $B_{10}$ is later added to such fluid, a step of adding a new volume of $B_{10}$ or boron-B10 to the (AF) in the nuclear reactor within an appropriate time factor in accordance with use of the (AF) in the nuclear reactor and as a part of revitalizing the nuclear efficiency and control of the primary (AF) of said nuclear reactor.

* * * * *